(12) United States Patent
Goel et al.

(10) Patent No.: US 9,076,260 B2
(45) Date of Patent: Jul. 7, 2015

(54) STITCHING FOR PRIMITIVES IN GRAPHICS PROCESSING

(75) Inventors: Vineet Goel, Winter Park, FL (US); Usame Ceylan, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 13/599,645

(22) Filed: Aug. 30, 2012

(65) Prior Publication Data

US 2014/0063013 A1    Mar. 6, 2014

(51) Int. Cl.
*G06T 17/20* (2006.01)

(52) U.S. Cl.
CPC .................................. *G06T 17/20* (2013.01)

(58) Field of Classification Search
None
See application file for complete search history.

(56) References Cited

U.S. PATENT DOCUMENTS

| | | | |
|---|---|---|---|
| 5,488,684 A | 1/1996 | Gharachorloo et al. | |
| 6,028,607 A | 2/2000 | Chan | |
| 6,211,883 B1 | 4/2001 | Goel | |
| 6,438,266 B1 | 8/2002 | Bajaj et al. | |
| 6,445,389 B1 | 9/2002 | Bossen et al. | |
| 6,462,738 B1* | 10/2002 | Kato | 345/428 |
| 6,597,356 B1 | 7/2003 | Moreton et al. | |
| 6,600,488 B1* | 7/2003 | Moreton et al. | 345/423 |
| 6,747,644 B1 | 6/2004 | Deering | |
| 6,906,716 B2 | 6/2005 | Moreton et al. | |
| 6,940,505 B1 | 9/2005 | Savine et al. | |
| 7,423,644 B2 | 9/2008 | Goel et al. | |
| 8,120,607 B1 | 2/2012 | Legakis et al. | |
| 8,599,202 B1 | 12/2013 | Legakis et al. | |
| 2008/0024491 A1* | 1/2008 | Sathe et al. | 345/421 |
| 2009/0237401 A1 | 9/2009 | Wei et al. | |
| 2010/0164955 A1 | 7/2010 | Sathe et al. | |
| 2010/0214294 A1 | 8/2010 | Li et al. | |
| 2011/0057931 A1 | 3/2011 | Goel et al. | |
| 2011/0063294 A1 | 3/2011 | Brown et al. | |
| 2011/0128285 A1 | 6/2011 | Gong | |
| 2011/0267346 A1 | 11/2011 | Howson | |
| 2011/0310102 A1 | 12/2011 | Chang | |
| 2014/0063012 A1 | 3/2014 | Madani et al. | |
| 2014/0063014 A1 | 3/2014 | Goel et al. | |

OTHER PUBLICATIONS

Chhugani et al., "Geometry Engine Optimization: Cache Friendly Compressed Representation of Geometry", Proceedings I3D 2007, Apr. 30-May 2, 2007, 8 pp. XP040058183.

Choi et al., "Adaptive Tessellation of PN Triangles Using Minimum-Artifact Edge Linking," IEICE Transactions on Fundamentals of Electronics, Communications and Computer Sciences, Engineering Sciences Society, vol. E87-A, No. 10, Oct. 2004, 8 pp. XP001210488, ISSN: 0916-8508.

(Continued)

*Primary Examiner* — Daniel Hajnik

(74) *Attorney, Agent, or Firm* — Shumaker & Sieffert, P.A.

(57) ABSTRACT

Techniques described in the disclosure are generally related to determining the manner in which to connect points that reside along an outer ring edge and an inner ring edge for purposes of tessellation. For example, a two-dimensional (2D) stitching table may define the manner in which points along the edges should be connected together to form a plurality of primitives. The techniques may index the 2D stitching table to retrieve entry values that define the manner in which the points along the edges should be connected together.

24 Claims, 13 Drawing Sheets

(56) References Cited

OTHER PUBLICATIONS

Espino et al., "Hardware support for adaptive tessellation of Bezier surfaces based on local tests", Journal of Systems Architecture, vol. 53, No. 4, Apr. 2007, 18 pp. XP005891873, ISSN: 1383-7621.
Hoppe, "Optimization of Mesh Locality for Transparent Vertex Caching", Computer Graphics Proceedings, Annual Conference Series, SIGGRAPH 99, Aug. 8-13, 1999, 8 pp., XP000981469.
International Search Report and Written Opinion—PCT/US2013/052064—ISA/EPO—Dec. 12, 2013, 14 pp.
Livny et al., "Seamless patches for GPU-based terrain rendering," The Visual Computer; International Journal of Computer Graphics, vol. 25, No. 3, Mar. 11, 2008,12 pp. XP019711678, ISSN: 1432-2315.
Luo et al., "Key Technology Research on Data Conversion between B-Rep Based CAD and VR Model", Measuring Technology and Mechatronics Automation, 2009, ICMTMA '09, International Conference on, IEEE, Apr. 11-12, 2009, 4 pp. XP031511401, ISBN: 978-0-7695-3583-8.
Moreton, "Watertight Tessellation using Forward Differencing", HWWS 01 Proceedings of the ACM SIGGRAPH/Eurographics workshop on Graphics hardware, Dec. 2001, 8 pp. XP055056554.
Ni et al., "Efficient substitutes for subdivision surfaces", ACM SIGGRAPH 2009 Course Notes, Aug. 5, 2009, 107 pp. XP055084843.
Taubin et al., "Geometric Compression through Topological Surgery," MPEG Meeting; San Jose; (Motion Picture Expert Group or ISO/IEC JTC1/SC29/WG11), No. M3059, Feb. 1997, 16 pp. XP030032332, ISSN: 0000-0315.
Yang et al., CAD data visualization on mobile devices using sequential constrained Delaunay triangulation, Computer Aided Design, Elsevier Publishers, vol. 41, No. 5, May 2009, 10 pp. XP026096451, ISSN: 0010-4485.
Gee, "Introduction to the Direct3d 11 Graphics Pipeline," 2008 NVIDIA Corporation, Aug. 2008, The World of Visual Computing, pp. 1-55.
"Microsoft Tessellation Overview," Windows Dev Center—Desktop, retrieved Feb. 22, 2012, pp. 1-6.
Naty, "Direct3d11 Details Part II: Tessellation," Real-Time Rendering, Aug. 2, 2008, pp. 1-3.
U.S. Appl. No. 13/599,218, by Nariman Moezzi Madani, filed Aug. 30, 2012.
U.S. Appl. No. 13/599,747, by Vineet Goel, filed Aug. 30, 2012.
Bill Bilodeau, "Report Information from ProQuest-Decal Tessellation," Feb. 19, 2012, 11 pp.

\* cited by examiner

| | A | B | C | D | E | F | G |
|---|---|---|---|---|---|---|---|
| 1 | 1 | | | | | | |
| 2 | 3 | 2 | 2 | | | | |
| 3 | 7 | 6 | 6 | 4 | 4 | 8 | 16 |
| 4 | 15 | 14 | 22 | 10 | 10 | 20 | 36 |
| 5 | 31 | 30 | 46 | 42 | 42 | 84 | 164 |
| 6 | 63 | 62 | 94 | 86 | 86 | 170 | 330 |
| 7 | 127 | 126 | 222 | 182 | 182 | 362 | 682 |
| 8 | 255 | 254 | 478 | 438 | 438 | 874 | 1706 |
| 9 | 511 | 510 | 958 | 950 | 1462 | 2922 | 5802 |
| 10 | 1023 | 1022 | 1918 | 1902 | 2926 | 5846 | 11606 |
| 11 | 2047 | 2046 | 3838 | 3806 | 5854 | 11702 | 23222 |
| 12 | 4095 | 4094 | 7678 | 7646 | 11742 | 23478 | 46518 |
| 13 | 8191 | 8190 | 15870 | 15326 | 23518 | 47030 | 93622 |
| 14 | 16383 | 16382 | 32254 | 31710 | 48094 | 96182 | 191926 |
| 15 | 32767 | 32766 | 65022 | 64478 | 97246 | 194486 | 388534 |
| 16 | 65535 | 65534 | 130558 | 130014 | 228318 | 456630 | 912822 |
| 17 | 131071 | 131070 | 261118 | 261086 | 490462 | 980918 | 1961398 |
| 18 | 262143 | 262142 | 522238 | 522174 | 980926 | 1961838 | 3922798 |
| 19 | 524287 | 524286 | 1044478 | 1044350 | 1961854 | 3923678 | 7845598 |
| 20 | 1048575 | 1048574 | 2088958 | 2088702 | 3923710 | 7847390 | 15691230 |
| 21 | 2097151 | 2097150 | 4177918 | 4177406 | 7847422 | 15694814 | 31382494 |
| 22 | 4194303 | 4194302 | 8355838 | 8355326 | 15695358 | 31390686 | 62766046 |
| 23 | 8388607 | 8388606 | 16711678 | 16711166 | 31391230 | 62782430 | 125533150 |
| 24 | 16777215 | 16777214 | 33423358 | 33422846 | 62782974 | 125565918 | 251100126 |
| 25 | 33554431 | 33554430 | 66977790 | 66846206 | 125566462 | 251132894 | 502234078 |
| 26 | 67108863 | 67108862 | 134086654 | 133955070 | 251395582 | 502791134 | 1005550558 |
| 27 | 134217727 | 134217726 | 268304382 | 268172798 | 503053822 | 1006107614 | 2012183518 |
| 28 | 268435455 | 268435454 | 536739838 | 536608254 | 1006370302 | 2012740574 | 4025449438 |
| 29 | 536870911 | 536870910 | 1073610750 | 1073479166 | 2013003262 | 4026006494 | 8051981278 |
| 30 | 1073741823 | 1073741822 | 2147220990 | 2147220990 | 4160486910 | 8320973790 | 16641915870 |
| 31 | 2147483647 | | | | | | |

FIG. 7A

| | H | I | J | K | L |
|---|---|---|---|---|---|
| 1 | 16 | 16 | 32 | 64 | 128 |
| 2 | 36 | 36 | 72 | 144 | 272 |
| 3 | 292 | 292 | 584 | 1168 | 2320 |
| 4 | 586 | 586 | 1172 | 2340 | 4644 |
| 5 | 1194 | 1194 | 2388 | 4772 | 9508 |
| 6 | 2730 | 2730 | 5460 | 10916 | 21796 |
| 7 | 10922 | 10922 | 21844 | 43684 | 87332 |
| 8 | 21846 | 21846 | 43690 | 87370 | 174666 |
| 9 | 43702 | 43702 | 87402 | 174762 | 349354 |
| 10 | 87478 | 87478 | 174954 | 349866 | 699050 |
| 11 | 175542 | 175542 | 351082 | 702122 | 1403562 |
| 12 | 355766 | 355766 | 711530 | 1423018 | 2845354 |
| 13 | 748982 | 748982 | 1497962 | 2995882 | 5991082 |
| 14 | 1797558 | 1797558 | 3595114 | 7190186 | 14379690 |
| 15 | 3894710 | 5991862 | 11983722 | 23967402 | 47934122 |
| 16 | 7789422 | 11983726 | 23967446 | 47934806 | 95868246 |
| 17 | 15578846 | 23967454 | 47934902 | 95869622 | 191736502 |
| 18 | 31157726 | 47934942 | 95869878 | 191739318 | 383473078 |
| 19 | 62315486 | 95869918 | 191739830 | 383479222 | 766946742 |
| 20 | 124632030 | 191740894 | 383481782 | 766963126 | 1533898166 |
| 21 | 249265118 | 383482846 | 766965686 | 1533930934 | 3067833782 |
| 22 | 498564062 | 766999518 | 1533999030 | 3067997622 | 6135967158 |
| 23 | 997161950 | 1534032862 | 3068065718 | 6136130998 | 12272233910 |
| 24 | 1995406302 | 3069148126 | 6138296246 | 12276592054 | 24553156022 |
| 25 | 3991895006 | 6139378654 | 12278757302 | 24557514166 | 49115000246 |
| 26 | 8018426846 | 12313394142 | 24626788278 | 49253576118 | 98507124150 |
| 27 | 16071490526 | 24661425118 | 49322850230 | 98645700022 | 197291371958 |
| 28 | 33251359710 | 50431228894 | 100862457782 | 201724915126 | 403449802166 |
| 29 | 67611098078 | 101970836446 | 203941672886 | 407883345334 | 815766662582 |
| 30 | 136330574814 | 239409789918 | 478819579830 | 957639159222 | 1915278290358 |
| 31 | 273769528286 | 514287696862 | 1028575393718 | 2057150786998 | 4114301545910 |

FIG. 7B

| | M | N | O | P | Q | R |
|---|---|---|---|---|---|---|
| 1 | 256 | 256 | 256 | 256 | 256 | 512 |
| 2 | 528 | 528 | 528 | 528 | 528 | 1056 |
| 3 | 4624 | 8720 | 16912 | 16912 | 16912 | 33824 |
| 4 | 9252 | 17444 | 33828 | 33828 | 33828 | 67656 |
| 5 | 18724 | 35108 | 67876 | 67876 | 67876 | 135752 |
| 6 | 43300 | 84260 | 149796 | 149796 | 149796 | 299592 |
| 7 | 174372 | 346404 | 674084 | 1198372 | 1198372 | 2396744 |
| 8 | 348746 | 692810 | 1348170 | 2396746 | 2396746 | 4793492 |
| 9 | 697514 | 1385642 | 2696362 | 4793514 | 4793514 | 9587028 |
| 10 | 1395370 | 2771626 | 5393066 | 9587370 | 9587370 | 19174740 |
| 11 | 2796202 | 5548714 | 10791594 | 19180202 | 19180202 | 38360404 |
| 12 | 5679786 | 11184810 | 21670570 | 38447786 | 38447786 | 76895572 |
| 13 | 11971242 | 23767722 | 44739242 | 78293674 | 78293674 | 156587348 |
| 14 | 28748458 | 57322154 | 111848106 | 178956970 | 178956970 | 357913940 |
| 15 | 95857322 | 191539882 | 380283562 | 715827882 | 715827882 | 1431655764 |
| 16 | 191714646 | 383079766 | 760567126 | 1431655766 | 1431655766 | 2863311530 |
| 17 | 383429302 | 766159542 | 1521134262 | 2863311542 | 2863311542 | 5726623082 |
| 18 | 766858678 | 1532319158 | 3042268598 | 5726623158 | 5726623158 | 11453246314 |
| 19 | 1533717942 | 3064638902 | 6084537782 | 11453246902 | 11453246902 | 22906493802 |
| 20 | 3067440566 | 6129282486 | 12169080246 | 22906498486 | 22906498486 | 45812996970 |
| 21 | 6134918582 | 12258602422 | 24338197942 | 45813034422 | 45813034422 | 91626068842 |
| 22 | 12270136758 | 24517504438 | 48676695478 | 91626368438 | 91626368438 | 183252736874 |
| 23 | 24542670262 | 49037405622 | 97355787702 | 183255133622 | 183255133622 | 366510267242 |
| 24 | 49104514486 | 98093985206 | 194730749366 | 366529441206 | 366529441206 | 733058882410 |
| 25 | 98228202934 | 196341362102 | 389614890422 | 733212274102 | 733212274102 | 1466424548202 |
| 26 | 197012450742 | 393909857718 | 780456914358 | 1467651681718 | 1467651681718 | 2935303363434 |
| 27 | 394580946358 | 789046848950 | 1570730896822 | 2945120431542 | 2945120431542 | 5890240863082 |
| 28 | 806897806774 | 1613680569782 | 3219998338486 | 5968777407926 | 5968777407926 | 11937554815850 |

FIG. 7C

| | S | T | U | V | W |
|---|---|---|---|---|---|
| 1 | 1024 | 2048 | 4096 | 8192 | 16384 |
| 2 | 2112 | 4224 | 8448 | 16640 | 33024 |
| 3 | 67648 | 135296 | 270592 | 540928 | 1081600 |
| 4 | 135312 | 270608 | 541200 | 1081872 | 2163216 |
| 5 | 271504 | 542992 | 1085968 | 2171408 | 4342288 |
| 6 | 599184 | 1198352 | 2396688 | 4792848 | 9585168 |
| 7 | 4793488 | 9586960 | 19173904 | 38347280 | 76694032 |
| 8 | 9586980 | 19173924 | 38347812 | 76694564 | 153388068 |
| 9 | 19174052 | 38348068 | 76695844 | 153389348 | 306776356 |
| 10 | 38349476 | 76698916 | 153397540 | 306792740 | 613566756 |
| 11 | 76720804 | 153441572 | 306882852 | 613763364 | 1227508004 |
| 12 | 153791140 | 307582244 | 615164196 | 1230326052 | 2460633380 |
| 13 | 313174692 | 626349348 | 1252698404 | 2505394468 | 5010770212 |
| 14 | 715827876 | 1431655716 | 2863311140 | 5726619940 | 11453221156 |
| 15 | 2863311524 | 5726623012 | 11453245732 | 22906489124 | 45812959524 |
| 16 | 5726623050 | 11453246026 | 22906491466 | 45812978250 | 91625919050 |
| 17 | 11453246122 | 22906492074 | 45812982954 | 91625956522 | 183251838122 |
| 18 | 22906492586 | 45812984490 | 91625966250 | 183251913386 | 366503676586 |
| 19 | 45812987562 | 91625974442 | 183251937962 | 366503832234 | 733007358634 |
| 20 | 91625993898 | 183251987114 | 366503963306 | 733007751850 | 1466014804650 |
| 21 | 183252137642 | 366504274602 | 733008538282 | 1466016901802 | 2932031007402 |
| 22 | 366505473706 | 733010946730 | 1466021882538 | 2932043590314 | 5864084384426 |
| 23 | 733020534442 | 1466041068202 | 2932082125482 | 5864164076202 | 11728325356202 |
| 24 | 1466117764778 | 2932235528874 | 5864471046826 | 11728941918890 | 23457881041578 |
| 25 | 2932849096362 | 5865698192042 | 11731396373162 | 23462792571562 | 46925582346922 |
| 26 | 5870606726826 | 11741213452970 | 23482426895018 | 46964853615274 | 93929704434346 |
| 27 | 11780481726122 | 23560963451562 | 47121926892202 | 94243853609642 | 188487704423082 |
| 28 | 23875109631658 | 47750219262634 | 95500438514346 | 191000876853930 | 382001750911658 |

FIG. 7D

| | X | Y | Z | AA | AB |
|---|---|---|---|---|---|
| 1 | 32768 | 65536 | 65536 | 65536 | 65536 |
| 2 | 65792 | 131328 | 131328 | 131328 | 131328 |
| 3 | 2162944 | 4325632 | 8519936 | 16908544 | 33685760 |
| 4 | 4325904 | 8651280 | 17039888 | 33817104 | 67371536 |
| 5 | 8667664 | 17318416 | 34095632 | 67650064 | 134758928 |
| 6 | 19153424 | 38289936 | 76038672 | 151536144 | 285753872 |
| 7 | 153371152 | 306725392 | 612909584 | 1225277968 | 2433237520 |
| 8 | 306742308 | 613450788 | 1225819172 | 2450555940 | 4866475044 |
| 9 | 613484836 | 1226901796 | 2451638564 | 4901112100 | 9732950308 |
| 10 | 1226983716 | 2453817636 | 4903291172 | 9802238244 | 19465914660 |
| 11 | 2454866212 | 4908534052 | 9807481124 | 19605375268 | 38932728100 |
| 12 | 4921116964 | 9841035556 | 19672484132 | 39268272420 | 77922978084 |
| 13 | 10021390628 | 20041582884 | 40073578788 | 80070461732 | 159527356708 |
| 14 | 22906292516 | 45811386660 | 91613186340 | 183149676836 | 365685786916 |
| 15 | 91625769252 | 183250340132 | 366491093284 | 732905490724 | 1465197414692 |
| 16 | 183251538506 | 366500680266 | 732982186570 | 1465810981450 | 2930394829386 |
| 17 | 366503077034 | 733001360554 | 1465964373162 | 2931621962922 | 5860789658794 |
| 18 | 733006154410 | 1466002721450 | 2931928746666 | 5863243926186 | 11721579317930 |
| 19 | 1466012314282 | 2932005448362 | 5863857498794 | 11726487857834 | 23443158641322 |
| 20 | 2932024715946 | 5864010984106 | 11727715084970 | 23452975803050 | 46886317370026 |
| 21 | 5864050829994 | 11728023366314 | 23455431568042 | 46905953004202 | 93772636138154 |
| 22 | 11728124029610 | 23456069102250 | 46910885505706 | 93811928378026 | 187545294645930 |
| 23 | 23456605973162 | 46912496118442 | 93822128925354 | 187624214669994 | 375090947205802 |
| 24 | 46915717343914 | 93830718859946 | 187649984473770 | 375241559630500 | 750187621034666 |
| 25 | 93851119954602 | 187701524081322 | 375391594916522 | 750599937895082 | 1500467686803810 |
| 26 | 187859364129450 | 375718012431018 | 751424571615914 | 1502665891293860 | 3002399751580330 |
| 27 | 376975364106922 | 753950012385962 | 1507888857152580 | 3015593891113640 | 6028255751219880 |
| 28 | 764003457084074 | 1528006198340260 | 3056000094334410 | 6111181863493085 | 12220705238854300 |

FIG. 7E

|   | AC | AD | AE |
|---|---|---|---|
| 1 | 65536 | 65536 | 65536 |
| 2 | 131328 | 131328 | 131328 |
| 3 | 67240192 | 67240192 | 67240192 |
| 4 | 134480400 | 134480400 | 134480400 |
| 5 | 268976656 | 268976656 | 268976656 |
| 6 | 554189328 | 554189328 | 554189328 |
| 7 | 4849156624 | 9144123920 | 17734058512 |
| 8 | 9698313252 | 18288247844 | 35468117028 |
| 9 | 19396626724 | 36576495908 | 70936234276 |
| 10 | 38793267492 | 73153005860 | 141872482596 |
| 11 | 77587433764 | 146306910500 | 283745863972 |
| 12 | 155232389412 | 292671342884 | 567549249828 |
| 13 | 314146179364 | 589024086308 | 1138779900196 |
| 14 | 726463039780 | 1413657807140 | 2513169434916 |
| 15 | 2925486295332 | 5811704318244 | 11309262457124 |
| 16 | 5850972590666 | 11623408636490 | 22618524914250 |
| 17 | 11701945181354 | 23246817273002 | 45237049828522 |
| 18 | 23403890363050 | 46493634546346 | 90474099657386 |
| 19 | 46807780731562 | 92987269098154 | 180948199320234 |
| 20 | 93615561550506 | 185974538283690 | 361896398727850 |
| 21 | 187231124499114 | 371949077965482 | 723792798853802 |
| 22 | 374462713678850 | 743898178300586 | 1447585620077220 |
| 23 | 748924900649642 | 1487796714515110 | 2895171598068390 |
| 24 | 1497855527922340 | 2975599155653290 | 5790348922759850 |
| 25 | 2995802681813670 | 5951289937275560 | 11580789471488600 |
| 26 | 5993071379131050 | 11904045890054800 | 23163044958481000 |
| 27 | 12009599006321300 | 23831548028168800 | 46349546165021300 |
| 28 | 24394497981590100 | 48038396025285200 | 93074392298990200 |

FIG. 7F

| | AF | AG |
|---|---|---|
| 1 | | |
| 2 | 65536 | 65536 |
| 3 | 131328 | 131328 |
| 4 | 67240192 | 67240192 |
| 5 | 134480400 | 134480400 |
| 6 | 268976656 | 268976656 |
| 7 | 554189328 | 554189328 |
| 8 | 17734058512 | 17734058512 |
| 9 | 35468117028 | 35468117028 |
| 10 | 70936234276 | 70936234276 |
| 11 | 141872482596 | 141872482596 |
| 12 | 283745863972 | 283745863972 |
| 13 | 567549249828 | 567549249828 |
| 14 | 1138779900196 | 1138779900196 |
| 15 | 2513169434916 | 2513169434916 |
| 16 | 2010535479332 | 2010535479332 |
| 17 | 4021071095866 | 4021071095866 |
| 18 | 8042142191735 | 8042142191735 |
| 19 | 16084284383505 | 16084284383505 |
| 20 | 32168568767556 | 32168568767556 |
| 21 | 64337137543850 | 64337137543850 |
| 22 | 128674275227511 | 128674275227511 |
| 23 | 257348552691985 | 257348552691985 |
| 24 | 514697141175364 | 514697141175364 |
| 25 | 1029394855013030 | 1029394855013030 |
| 26 | 2058798872622960 | 2058798872622960 |
| 27 | 4117744346796300 | 4117744346796300 |
| 28 | 8237834318398530 | 8237834318398530 |
| 29 | 16513198633691800 | 16513198633691800 |

FIG. 7G

STITCHING FOR PRIMITIVES IN GRAPHICS PROCESSING

TECHNICAL FIELD

This disclosure relates to stitching for primitives in graphics processing, and more particularly, to stitching with tessellation.

BACKGROUND

A graphics processing unit (GPU) may implement a graphics processing pipeline that includes a tessellation stage. The tessellation stage converts a surface into a plurality of primitives on the GPU, resulting in a more detailed surface. For example, the GPU can receive information for a coarse surface, and generate a high resolution surface, rather than receiving information for the high resolution surface. Receiving information for the high resolution surface, rather than the coarse surface, may be bandwidth inefficient because the amount of information needed to define the high resolution surface may be much greater than the amount of information needed to define coarse resolution surface.

SUMMARY

In general, the techniques described in this disclosure are directed to utilizing a single two-dimensional (2D) lookup table (LUT) for determining the manner in which primitives are to be stitched. For example, the index to the 2D LUT may be based on tessellation factors that indicate the manner in which to generate the primitives. A tessellation unit may index the 2D LUT based on the tessellation factors to retrieve an entry value. The tessellation unit may examine each bit in the entry value to determine the manner in which to stitch points that reside along an outer ring edge and a corresponding inner ring edge.

In one example, this disclosure describes a method for tessellation. The method includes determining, with a graphics processing unit (GPU), a number of points along an outer ring edge of a domain, and determining, with the GPU, a number of points along an inner ring edge of the domain. The method also includes utilizing, with the GPU, based on the number of points along the outer ring edge and the number of points along the inner ring edge, only a single two-dimensional (2D) stitching table to determine how many points and which points of the outer ring edge and how many points and which points of the inner ring edge to use to generate each of a plurality of primitives whose vertices are the points along the outer ring edge and the points along the inner ring edge, and outputting, with the GPU, coordinates of the vertices.

In one example, this disclosure describes a tessellation unit for a GPU. The tessellation unit includes a first unit configured to determine a number of points along an outer ring edge of a domain, and determine a number of points along an inner ring edge of the domain. The tessellation unit also includes a second unit configured to utilize, based on the number of points along the outer ring edge and the number of points along the inner ring edge, only a single two-dimensional (2D) stitching table to determine how many points and which points of the outer ring edge and how many points and which points of the inner ring edge to use to generate each of a plurality of primitives whose vertices are the points along the outer ring edge and the points along the inner ring edge, and output coordinates of the vertices.

In one example, this disclosure describes a device that includes a central processing unit (CPU) and a GPU. The CPU is configured to generate a patch to be tessellated. The GPU includes a first unit configured to receive the patch as an input patch and output control points and tessellation factors for an output patch based on the input patch. The GPU also includes a tessellation unit configured to determine a type of a domain based on the tessellation factors, determine a number of points along an outer ring edge of the domain based on the tessellation factors, determine a number of points along an inner ring edge of the domain based on the tessellation factors, utilize, based on the number of points along the outer ring edge and the number of points along the inner ring edge, only a single two-dimensional (2D) stitching table to determine how many points and which points of the outer ring edge and how many points and which points of the inner ring edge to use to generate each of a plurality of primitives whose vertices are the points along the outer ring edge and the points along the inner ring edge, and output coordinates of the vertices. The GPU also includes a second unit configured to receive the coordinates of the vertices and add the primitives to the output patch based on the received coordinates of the vertices.

In one example, this disclosure describes a tessellation unit for a GPU. The tessellation unit includes means for determining a number of points along an outer ring edge of a domain, and means for determining a number of points along an inner ring edge of the domain. The tessellation unit also includes means for utilizing, based on the number of points along the outer ring edge and the number of points along the inner ring edge, only a single two-dimensional (2D) stitching table to determine how many points and which points of the outer ring edge and how many points and which points of the inner ring edge to use to generate each of a plurality of primitives whose vertices are the points along the outer ring edge and the points along the inner ring edge, and means for outputting coordinates of the vertices.

In one example, this disclosure describes a computer-readable storage medium including instructions stored thereon that when executed cause one or more processors to determine a number of points along an outer ring edge of a domain, determine a number of points along an inner ring edge of the domain, utilize, based on the number of points along the outer ring edge and the number of points along the inner ring edge, only a single two-dimensional (2D) stitching table to determine how many points and which points of the outer ring edge and how many points and which points of the inner ring edge to use to generate each of a plurality of primitives whose vertices are the points along the outer ring edge and the points along the inner ring edge, and output coordinates of the vertices.

The details of one or more examples are set forth in the accompanying drawings and the description below. Other features, objects, and advantages will be apparent from the description and drawings, and from the claims.

BRIEF DESCRIPTION OF DRAWINGS

FIGS. 7A-7G together illustrate an example of a stitching table.

DETAILED DESCRIPTION

Figure 1:
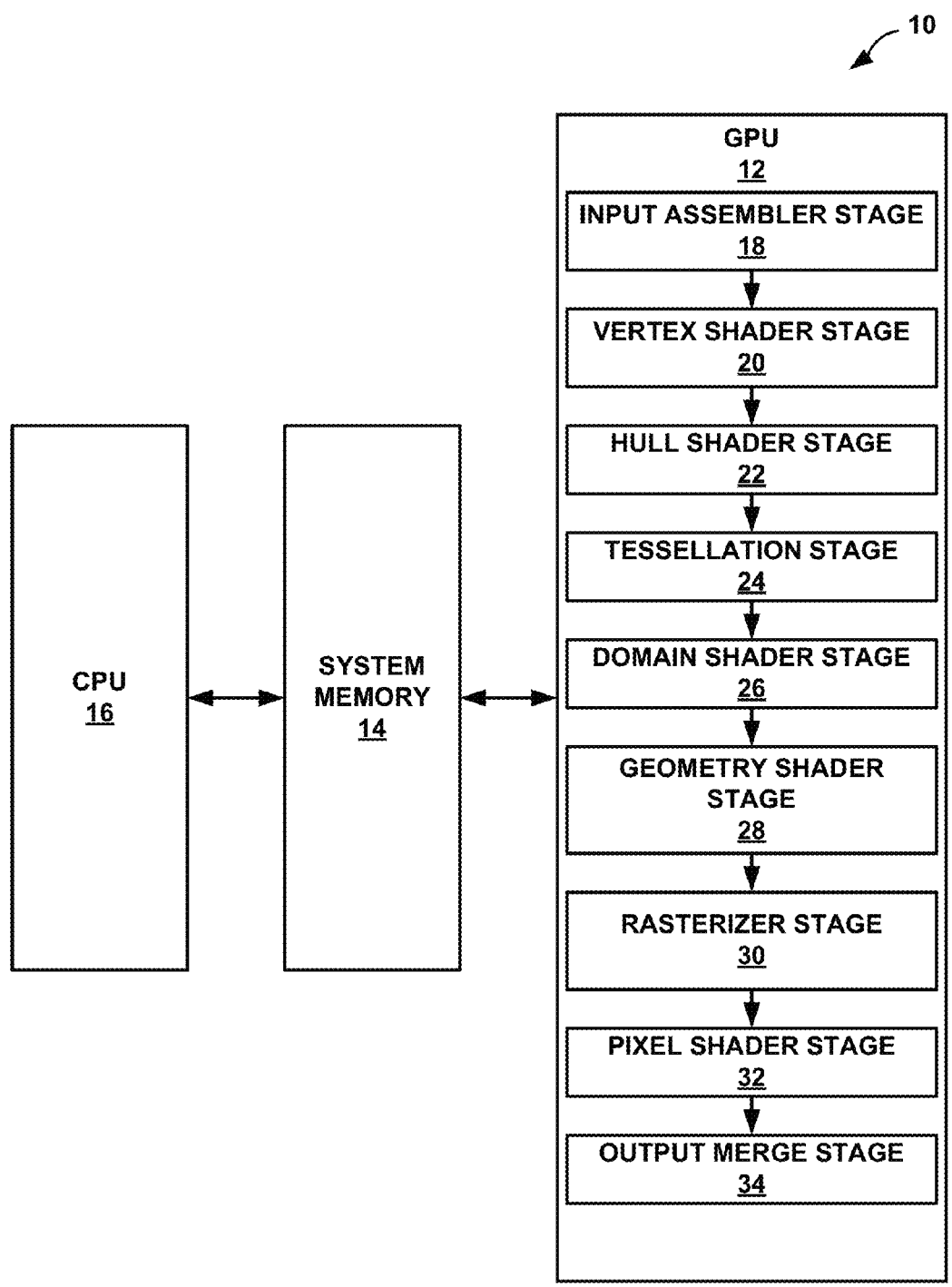
FIG. 1 is a block diagram illustrating an example of a graphics processing unit (GPU) that may implement an example of a graphics processing pipeline in accordance with one or more examples described in this disclosure.

Modern mobile devices, such as laptop computer, tablet computers, smartphones, and digital media players, may include a CPU (Central Processing Unit), a graphics processing unit (GPU) and system memory. When rendering graphics as part of executing an application, the CPU transmits instructions and graphics data to the GPU. In some examples, the graphics data may be in the form of vertices, which may comprise one or more data structures that describes a point in 2D or 3D space.

The application executing on the CPU may communicate with the GPU in accordance with an application programming interface (API). For instance, the application may communicate with the GPU in accordance with the DirectX® API developed by Microsoft® or the OpenGL® API developed by the Khronos Group, as two examples. For purposes of illustration and to ease with understanding, the techniques described in this disclosure are generally described in the context of the DirectX and OpenGL APIs. However, aspects of this disclosure should not be considered limited to the DirectX and OpenGL APIs, and the techniques described in this disclosure may be extended to other APIs as well.

DirectX and OpenGL each define graphics processing pipelines that are to be implemented by a GPU. These graphics processing pipelines may include a combination of programmable stages, as well as fixed-function stages. Some recent versions of the APIs, such as the Direct3D 11 API and the OpenGL 4.x API, include a tessellation process that is to be performed by the GPU.

The tessellation process refers to dividing a portion (referred to as patch) of a surface of an object into a plurality of smaller portions, and interconnecting the smaller portions together. This results in a more highly detailed surface, as compared to the surface prior to tessellation. Tessellation allows the application executing on the CPU to define the surface with low resolution, which may require few points, and allows the GPU to generate a higher resolution surface.

With tessellation, computation efficiency may be realized because the application executing on the CPU may not need to generate the higher resolution surface, and may instead offload the generation the higher resolution surface to the GPU. Furthermore, bandwidth efficiency may also be realized because the CPU may need to transmit information for fewer points of the surface because the low resolution surface includes fewer points as compared to the higher resolution surface, and the GPU may need to retrieve fewer points of the surface.

As described above, the GPU applies the tessellation process to a patch. A patch may be considered as a specialized type of a primitive. A patch is defined by one or more control points that together form a portion of a surface. For example, an object, such as a sphere, may be divided into a plurality of surfaces. In this example, the surfaces may be curved surfaces that, when combined, form the sphere. Each one of the surfaces may be divided into one or more patches, where each of the patches is defined by one or more control points.

The control points may be defined by coordinates (e.g., x and y coordinates for two-dimensional patches or x, y, and z coordinates for three-dimensional patches), and the control points may be considered as vertices of the patch. There may be any number of control points in a patch. For instance, in some examples, the number of control points in a patch may be between one control point up to 32 control points. The number of control points in a patch may be fixed or user defined.

Unlike other primitive types, the control points within the patches may be connected to one another in any way. In other words, there is no predefined way in which the control points of the patches are connected. For example, a standard triangle primitive includes three vertices, and the primitive is defined with a specific way in which the three vertices are connected with one another to form the triangle. The control points, on the other hand, may not need to be connected in any specific way to form a shape. Rather, as one example, some control points in a patch may be connected with one another to form a triangle, other control points in the same patch may be connected with one another to form a rectangle, and yet other control points in the same patch may be connected with one another to form an octagon. As another example, it may be possible that the control points are connected with another to form the same type of shapes as well (e.g., connected to only form a plurality of triangles).

The control points that define a patch of a surface may define a low resolution surface. With the tessellation process, additional detail is added to create a higher resolution surface. For example, referring back to the example of the sphere. If only the control points were used to form the sphere, the sphere would appear jaggy with stair step like points, rather than a smooth curved surface. After tessellation, additional points are added such that when these points are connected, the sphere appears as if it is a smooth sphere.

The tessellation process, in accordance with the both the DirectX API and the OpenGL 4.x API, includes two shaders and a fixed-function unit. A shader is a software application that executes on a programmable shader core of the GPU, and provides substantial functional flexibility. The fixed-function unit is a hardwired logic unit that performs fixed functions, and may not provide functional flexibility. However, it may be possible to implement the functions of the fixed-function unit using a programmable shader coder to provide additional functional flexibility. Solely for purposes of illustration, the functions described in this disclosure for the fixed-function unit are described with a fixed-function unit that provides limited functional flexibility.

In the DirectX API, a graphics processing pipeline that is configured to implement the tessellation process includes a hull-shader stage coupled to a tessellation stage, which is coupled to a domain-shader stage. The hull-shader stage and the domain-shader stage in the DirectX API may form the two shaders of the tessellation process, and the tessellation stage may form the fixed-function unit of the tessellation process. The other stages in the graphics processing pipeline are similar to those in DirectX APIs that do not implement the tessellation process.

In the OpenGL 4.x API, a graphics processing pipeline that is configured to implement the tessellation process includes a tessellation control shader coupled to a primitive generator, which is coupled to a tessellation evaluation shader. The tessellation control shader and the tessellation evaluation shader in OpenGL 4.x may form the two shaders of the tessellation process, and the primitive generator may form the fixed-function unit of the tessellation process. The other stages in the graphics processing pipeline may be similar to those in OpenGL APIs that do not implement the tessellation process.

The techniques described in this disclosure are related generally to the fixed-function unit of the tessellation process (e.g., the tessellation stage of the DirectX graphics processing pipeline and the primitive generator of the OpenGL 4.x graphics processing pipeline). For purposes of brevity, the fixed-function unit of the tessellation process is referred to as a tessellation unit. For instance, examples of the tessellation unit include the tessellation stage of the DirectX graphics processing pipeline, the primitive generator of the OpenGL 4.x graphics processing pipeline, or any other analogous unit for other types of graphics processing pipelines.

As described in more detail, the shader preceding the tessellation unit (e.g., the hull shader stage in DirectX or the tessellation control shader in OpenGL 4.x) transmits values to the tessellation unit that indicate how many primitives are to be generated for the patch to increase the resolution (i.e., increase the detail) of the patch. The shader preceding the tessellation unit also transmits a domain type to the tessellation unit. The tessellation unit divides a domain into the primitives, and indicates the manner in which the primitives in the domain are to be connected (i.e., the manner in which the primitives in the domain are to be stitched).

The domain is a template shape that the tessellation unit divides into a plurality of primitives. It is these primitives that are then added to the patch to increase the resolution of patch. For example, the additional primitives generated in the domain are then used to form a mesh on the patch, thereby adding detail to the patch.

The shader subsequent to the tessellation unit (e.g., the domain shader in DirectX or the tessellation evaluation shader in OpenGL 4.x) receives the vertices of the primitives generated by the tessellation unit, and connectivity information for the vertices from the tessellation unit. The shader subsequent to the tessellation unit then adds the primitives, as generated by the tessellation unit, to the patch to add more resolution to the surface.

In accordance with techniques described in this disclosure, the tessellation unit may utilize a single two-dimensional (2D) look-up table to determine the manner in which the generated primitives are to be connected (i.e., stitched). For example, there may be fixed, pre-defined ways in which the primitives are to be stitched based on various factors such as how many primitives the tessellation unit is to generate. Rather than using multiple look-up tables to determine how to stitch the primitives, the techniques described in this disclosure provide for a single two-dimensional look-up table to which the tessellation unit refers for purposes of determining how to stitch the primitives.

For example, some other techniques that rely upon multiple look-up tables expend computational cycles determining whether or not a value from a table is to be used. For instance, computational cycles may be wasted in some of these other techniques in reading bits from the table, determining whether the bits are to be used, and then reading next bits if the read bits are not be used. Then, in these other techniques, computational cycles would be further wasted in determining which other table to use. By using a single two-dimensional look-up table to determine how to stitch the primitives, computational efficiency may be promoted.

Stitching may be considered as the process of connecting vertices together to form primitives. For example, as part of the tessellation process, the tessellation unit may determine points within the domain. These points form vertices of the primitives. Stitching refers to the process of determining which of these points should be used to generate a primitive within the domain.

As described in more detail, the tessellation unit may index the single 2D lookup table based on values determined by the preceding shader. For example, to indicate how many primitives the tessellation unit is to generate, the preceding shader may indicate the number of points that reside along an edge of an outer ring of the domain, and a number of points that reside along an edge of an inner ring of the domain. The tessellation unit may utilize these values as indices to the single 2D lookup table.

From these indices, the tessellation unit may retrieve an entry value from the 2D lookup table. Hence, different combinations of numbers of points along the edge of the outer edge and inner ring of a domain may yield different entry values from the LUT. The entry value may include a plurality of bits such as 64 bits, as one non-limiting example. The tessellation unit may determine the bit value of one or more bits of the entry value. For example, the tessellation unit may start from the least significant bit (LSB) and move to the most significant bit (MSB), or vice-versa, or in any predefined pattern within the value. Each bit value may indicate how many points the tessellation unit is to use from the outer edge and how many points the tessellation unit is to use from the inner edge for stitching.

In this manner, the tessellation unit may need to access a single look-up table, rather than multiple look-up tables to determine the manner in which the primitives are to be stitched. This may result in fewer accesses to memory where the look-up table is stored, as compared to when multiple look-up tables are needed, which promotes efficient bandwidth utilization. Furthermore, by utilizing only one look-up table, and not any other look-up table for stitching, computational efficiency may also be realized. For instance, the techniques described in this disclosure may result in requiring fewer bits to be read, as well as a reduction in computational cycles needed to determine which table to retrieve values from.

FIG. 1 is a block diagram illustrating an example of a graphics processing unit (GPU) that may implement an example of a graphics processing pipeline in accordance with one or more examples described in this disclosure. FIG. 1 illustrates device 10 that includes graphics processing unit (GPU) 12, system memory 14, and central processing unit (CPU) 16. Examples of device 10 include, but are not limited to, mobile wireless telephones, video gaming consoles that include video displays, mobile video conferencing units, laptop computers, desktop computers, television set-top boxes, and the like.

CPU 16 may execute various types of applications. Examples of the applications include web browsers, e-mail applications, spreadsheets, video games, or other applications that generate viewable objects for display. Instructions for execution of the one or more applications may be stored within system memory 14. CPU 16 may transmit graphics data of the generated viewable objects to GPU 12 for further processing.

For example, GPU 12 may be specialized hardware that allows for massive parallel processing, which functions well for processing graphics data. In this way, CPU 16 offloads graphics processing that is better handled by GPU 12. CPU 16 may communicate with GPU 12 in accordance with a particular application processing interface (API). Examples of such APIs include the DirectX® API by Microsoft® and the OpenGL® by the Khronos group; however, aspects of this disclosure are not limited to the DirectX and the OpenGL APIs, and may be extended to other types of APIs that have been developed, are currently being developed, or are to be developed in the future.

Figure 2:
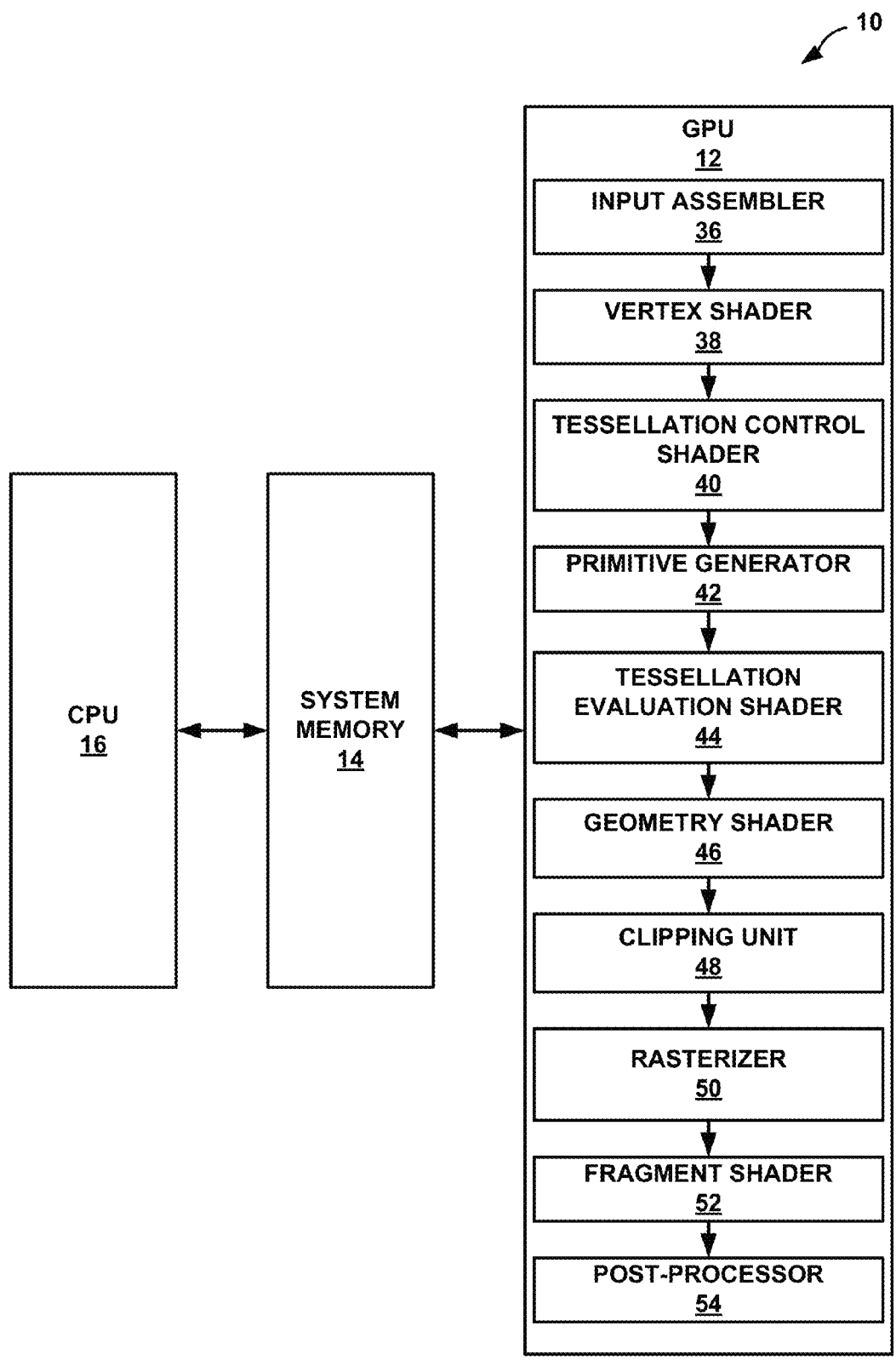
FIG. 2 is a block diagram illustrating another example of a graphics processing unit (GPU) that may implement another example of a graphics processing pipeline in accordance with one or more examples described in this disclosure.

In addition to defining the manner in which GPU 12 is to receive graphics data from CPU 16, the APIs may define a particular graphics processing pipeline that GPU 12 is to implement. GPU 12, in FIG. 1, illustrates the graphics processing pipeline defined by the Direct3D 11 API. As described in more detail, FIG. 2 illustrates the graphics processing pipeline of the OpenGL 4.x API.

Examples of CPU 16 and GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may be specialized hardware that includes integrated and/or discrete logic circuitry that provides GPU 12 with massive parallel processing capabilities suitable for graphics processing. In some instances, GPU 12 may also include general purpose processing, and may be referred to as a general purpose GPU (GPGPU). The techniques described in this disclosure may also be applicable to examples where GPU 12 is a GPGPU.

System memory 14 may comprise one or more computer-readable storage media. Examples of system memory 14 include, but are not limited to, a random access memory (RAM), a read only memory (ROM), an electrically erasable programmable read-only memory (EEPROM), flash memory, or any other medium that can be used to carry or store desired program code in the form of instructions and/or data structures and that can be accessed by a computer or a processor.

In some aspects, system memory 14 may include instructions that cause CPU 16 and/or GPU 12 to perform the functions ascribed to CPU 16 and GPU 12 in this disclosure. Accordingly, system memory 14 may be a computer-readable storage medium comprising instructions that cause one or more processors, e.g., CPU 16 and GPU 12, to perform various functions.

System memory 14 may, in some examples, be considered as a non-transitory storage medium. The term "non-transitory" may indicate that the storage medium is not embodied in a carrier wave or a propagated signal. However, the term "non-transitory" should not be interpreted to mean that system memory 14 is non-movable. As one example, system memory 14 may be removed from device 10, and moved to another device. As another example, a system memory, substantially similar to system memory 14, may be inserted into device 10. In certain examples, a non-transitory storage medium may store data that can, over time, change (e.g., in RAM).

The execution of the applications on CPU 16 causes CPU 16 to generate a plurality of primitives that connect together to form the viewable content. Examples of the primitives include points, lines, triangles, squares, or any other type of polygon. CPU 16 may define these primitives by their respective vertices. For example, CPU 16 may define coordinates and color values for the vertices. The coordinate values may be three-dimensional (3D) coordinates or 2D coordinates.

In accordance with the techniques described in this disclosure, in some cases, CPU 16 may also generate a special type of primitive referred to as a patch. Similar to the other primitive types, a patch may be defined by a plurality of vertices, referred to as control points of a patch. Unlike other primitive types, the patch may not be any particular shape. For example, CPU 16 may interconnect the control points of the patch in any manner, so that the interconnected control points form any desired shape. For other primitive types such as triangles, CPU 16 may define the specific manner in which the vertices are interconnected (e.g., such that interconnection of the vertices results in a triangle).

Also, unlike other primitive types, the number of control points in a patch may be variable. For example, the application executing on CPU 16 may define a maximum number of control points that are allowed for a patch, or the maximum number of control points may be user-defined. In some examples, the number of control points in a patch may be one to thirty-two control points; however, the techniques described in this disclosure are not so limited.

CPU 16 may utilize the control patch for purposes of tessellation. As described above, a tessellation process refers to CPU 16 defining a portion of a surface of a viewable object in low resolution, and tessellating the portion to generate a higher resolution version of the surface. For example, CPU 16 may define control points of the patch such that when the control points are interconnected the patch forms a portion of a surface of a viewable object. If a surface were to be formed only from the control points of the patch, the surface may not appear with high resolution and may appear jaggy. With tessellation, additional primitives are added to the patch, such that when the primitives are interconnected they add detail to the patch, which increases the resolution of the patch and results in higher quality viewable content.

GPU 12 may be configured to implement tessellation. In this way, CPU 16 may not need to define the vertices for all the additional primitives needed to create the higher resolution patch, which saves on computations performed by CPU 16. Also, CPU 16 may need to transmit fewer vertices (e.g., the vertices of the control points, and not the vertices of the primitives to be added), and GPU 12 may correspondingly need to receive fewer vertices, which promotes bandwidth efficiency due to fewer accesses to system memory 14.

To perform graphics operations, GPU 12 may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

As indicated above, the graphics processing pipeline illustrated in FIG. 1 is a graphic processing pipeline substantially as defined by Direct3D 11. In this example, GPU 12 may include one or more of input assembler stage 18, vertex shader stage 20, hull shader stage 22, tessellation stage 24, domain shader stage 26, geometry shader stage 28, rasterizer stage 30, pixel shader stage 32, and output merge stage 34. GPU 12 may include more stages than those illustrated, and in some examples, GPU 12 may not necessarily include all of the illustrated stages. Also, the specific ordering of the stages is provided for purposes of illustration and should not be considered limiting.

In techniques described in this disclosure, CPU 16 may output the control points of a patch to system memory 14.

GPU 12 may then retrieve the control points from system memory 14. In this manner, CPU 16 may transmit the control points to GPU 12. As used in this disclosure, CPU 16 transmitting to GPU 12, or GPU 12 receiving from CPU 16 may generally include CPU 16 writing to system memory 14, from which GPU 12 receives. Alternatively, it may be possible for CPU 16 to directly transmit to GPU 12, and for GPU 12 to directly receive from CPU 16.

Input assembler stage 18 may read the control points from system memory 14 as defined by CPU 16, and assemble the control points to form the patch. For instance, input assembler stage 18 may read the coordinates, color values, and other such information of the control points. The coordinates, color values, and other such information may be commonly referred to as attributes of the control points. Based on the attributes of the control points, input assembler stage 18 may determine the general layout of the patch. In this manner, input assembler stage 18 may assemble the control points to form the patch. Input assembler stage 18 may be a fixed-function unit.

Vertex shader stage 20 may process the vertices (e.g., the control points of the patch) from input assembler stage 18. For example, vertex shader stage 20 may perform per-vertex operations such as transformations, skinning, morphing, and per-vertex lighting. Vertex shader stage 20 may be a shader.

Hull shader stage 22 receives the control points of the patch, as processed by vertex shader stage 20, process the control points, and outputs control points for a processed patch. In other words, hull shader stage 22 receives an input patch, as processed by vertex shader stage 20, processes the input patch, and outputs an output patch. Hull shader stage 22 may perform various functions for processing the input patch. For example, hull shader stage 22 may modify the coordinates of the control points to change the locations of the control points, or may even add or delete control points.

In addition, hull shader stage 22 may determine values that indicate how many primitives are to be added to the patch generated by hull shader stage 22 (i.e., the output patch). Hull shader stage 22 may utilize various criteria to determine how many primitives are to be added to the patch. Described below are two example criteria that hull shader stage 22 may utilize to determine how many primitives are to be added to the patch. However, aspects of this disclosure are not so limited, and hull shader stage 22 may utilize any criteria to determine how many primitives should be added to the patch.

As one example, hull shader stage 22 may utilize information indicative of the depth of the patch to determine how many primitives should be added. For instance, a patch that is further away, from the perspective of the viewer, may not need high resolution because objects further in distance appear blurry in real life. However, a patch that is closer, from the perspective of the viewer, may need higher resolution because objects closer in distance appear sharper in real life. In this example, hull shader stage 22 may determine that fewer primitives should be added to the patch that is further away, and more primitives should be added to the patch that is closer, relative to one another.

As another example, hull shader stage 22 may determine how many primitives should be added based on the size of the patch. For a smaller sized patch, hull shader stage 22 may determine that fewer primitives should be added because the patch encompasses a smaller area. For a larger sized patch, hull shader stage 22 may determine that more primitives should be added because the patch encompasses a larger area.

Based on a determination of how many primitives should be added, hull shader stage 22 may output a domain type and values that indicate how many primitives are to be added to the patch to tessellation stage 24. The values that indicate how many primitives are to be added to the patch, in the Direct3D 11 API, are referred to as tessfactors.

The domain may be a considered as a template shape that tessellation stage 24 uses for tessellation purposes. Examples of the domain type include a line, a triangle, a quad (e.g., a four sided polygon), or any other type of polygon. The domain may be a two-dimensional (2D) shape, even if the patches define a three-dimensional (3D) surface or a 2D surface. When the domain is a line, the domain may be a one-dimensional (1D) shape (i.e., a line), even if the patches define a 3D surface, a 2D surface, or a 1D surface. For purposes of illustration, the techniques described in this disclosure are described with respect to the domain being a 2D surface. For instance, the techniques are described with domain shapes that are the triangle or quad.

In some examples, hull shader stage 22 may not explicitly indicate the domain type. Rather, tessellation stage 24 may determine the domain type based on the number of transmitted tessfactors. For example, the presence of four tessfactors may indicate that the domain type is a triangle domain type, and the presence of six tessfactors may indicate that the domain type is a quad domain type.

In some examples, a quad domain may be defined by 2D Cartesian coordinates (u, v). In some examples, a triangle domain may be defined by Barycentric coordinates. Barycentric coordinates utilize three coordinates to identify any point within the triangle. For example, the vertices of the triangle domain may be defined as (u, v, w), as described below in more detail. The location of any point within the triangle is defined by vertex weighting that indicates its proximity to a vertex. For instance, the closer a point is to a vertex, the higher its vertex weighting, and the further away the point is from the vertex, the lower its vertex weighting.

As an example, assume the vertices of the triangle are defined with Barycentric coordinates (u, v, w) as follows: (1, 0, 0), (0, 1, 0), and (0, 0, 1). In this example, the center point is located at (1/3, 1/3, 1/3) because the center point is equally distant from each of the vertices. Also, with the given definition of the vertex coordinates, in this example, the sum of the u, v, and w coordinates for any point within the triangle domain should equal one.

The Cartesian and Barycentric coordinates are described for purposes of illustration only, and should not be considered limiting. In other examples, it may be possible to define the quad domain with Barycentric coordinates or Cartesian coordinates, and the triangle domain with Cartesian coordinates or Barycentric coordinates. In general, a domain, of any type, may be defined using any coordinate system.

Tessellation stage 24 may tessellate (e.g., divide) the domain into a plurality of primitives. It should be understood that, in this example, tessellation stage 24 is not dividing the patch outputted by hull shader stage 22 into primitives, but rather dividing the domain into the primitives. In some examples, tessellation stage 24 may not even have access to the patch outputted by hull shader stage 22. Tessellation stage 24 may be a fixed-function unit, although aspects of this disclosure need not be so limited.

Tessellation stage 24 may utilize the tessfactors outputted by hull shader stage 22 to tessellate (e.g., divide) the domain into a plurality of primitives. For example, in addition to defining the domain type (e.g., triangle or quad) the tessfactors may define how many rings are to be included within the domain.

A ring may be a series of concentric shapes within the domain, where the concentric shapes are the same shape as the domain shape. For example, if the domain shape is a quad, the perimeter of the quad may be considered as the outer ring. Hull shader stage 22 may define the number of inner rings, which may be series of smaller sized quads that reside within the quad domain. Similarly, if the domain shape is a triangle, the perimeter of the triangle may be considered as the outer ring, and the inner rings may be series of smaller sized triangles that reside within the triangle domain.

In addition to defining the number of rings within a domain, the tessfactors define the points that reside along the rings. The points that reside along the rings should not be confused with control points. The control points define the patch. The points that reside along the rings are points generated by tessellation stage 24 based on the tessfactors. These points are generated within the domain, and not within the patch.

Also, it is these points that tessellation stage 24 connects together to divide the domain into a plurality of primitives. For example, assume that the primitives that tessellation stage 24 will divide the domain into are triangles. In this example, tessellation stage 24 may connect one point that resides along the outer ring, with two points that reside along the inner ring to form a triangle primitive. Alternatively, tessellation stage 24 may connect two points that reside along the outer ring with one point that resides along the inner ring to form a triangle primitive. In this way, by defining the domain type, the number of rings within the domain, and the number of points along the outer and inner rings, hull shader stage 22 may define the number of primitives into which tessellation stage 24 should divide the domain.

In some examples, the number of points that can reside along an edge of ring may be one point to sixty-four points. For example, if the domain type is a triangle, than there may be up to 65 points per edge of the triangle domain. Similarly, if the domain type is a quad, than there may be up to 65 points per edge of the quad. However, the techniques described in this disclosure are not limited to an edge having a maximum of sixty-four points.

Furthermore, the number of points that along a ring may be different for outer and inner rings. For example, the number of points that reside along an edge of the outer ring may be more than or less than the number points that reside along an edge of the inner ring. It may also be possible that number of points that reside along the edge of the outer ring and the inner ring are the same number of points.

Moreover, the number points along an edge of the same ring may be different. For example, for a triangle domain, the number of points that reside along one of the edges may be different than the number of points that reside along one other edge, or both edges. Similarly, for a quad domain, the number of points that reside along one of the edges may be different than the number of points that reside along one, two, or all three other, remaining edges. It may also be possible for each of the edges of the rings to have the same number of points.

As described above, in some examples, tessellation stage 24 may not divide the patch into a plurality of primitives. Accordingly, in some examples, tessellation stage 24 may not receive any information such as the number of control points, the locations of the control points, or the size of the patch. Without any information as to the size of the patch and the locations of the control points, tessellation stage 24 may not be able to define the size of the domain that is used or the specific coordinates for the vertices of the domain.

To address this, tessellation stage 24 may rely upon a normalized coordinate system for defining the vertices of the domain, as well as for determining the locations of the interconnected points within the domain. As one example of the normalized coordinates, tessellation stage 24 may define the vertices of a quad domain, in u, v coordinates, as: (0, 0), (1, 0), (0, 1), and (1, 1), which is a unit square. Tessellations stage 24 may define the vertices of a triangle domain, in u, v, w coordinates, as: (0, 0, 1), (0, 1, 0), and (1, 0, 0), which is an equilateral triangle. Tessellation stage 24 may determine the coordinates for the interconnected vertices of the plurality of primitives in this normalized coordinate system.

Tessellation stage 24 may output the vertices of the plurality of primitives of the domain to domain shader stage 26 in the normalized coordinate system (e.g., the u, v coordinates or the u, v, w coordinates, as applicable). The function of domain shader stage 26 may be to map the vertex coordinates, as received from tessellation stage 24, on to the patch. For example, while tessellation stage 24 may not receive information of the patch as defined by hull shader stage 22, domain shader stage 26 may receive such information from hull shader stage 22.

Domain shader stage 26 may execute for each vertex coordinate outputted by tessellation stage 24. With the coordinates of the control points of the patch from hull shader stage 22, domain shader stage 26 may determine the location of the vertex, as outputted by tessellation stage 24, on the patch. Because tessellation stage 24 outputs vertices of the plurality of primitives generated by tessellation stage 24, and domain shader stage 26 adds these primitives to the patch, the combination of hull shader stage 22, tessellation stage 24, and domain shader stage 26 together add additional primitives to the patch. This results in a mesh of primitives that are added to the patch creating a higher resolution, more detailed patch, as compared to the patch defined by CPU 16. In this manner, hull shader stage 22, tessellation stage 24, and domain shader stage 26 implement a tessellation process.

Geometry shader stage 28 receives the vertices of the primitives added to the patch by domain shader stage 26 and may further generate additional vertices for the primitives to add even more resolution. Rasterizer stage 30 receives the primitives from geometry shader stage 28 and converts the primitives into pixels for the display. For example, the primitives may be defined as vectors that indicate the interconnection of the primitives, and may be defined in a coordinate space that is independent of the display on which the image is to be displayed. Rasterizer stage 30 converts these vectors into the display coordinates, and performs any additional functions such as removing points within primitives that are occluded.

Pixel shader stage 32 receives the pixels as outputted by rasterizer stage 30 and performs post processing to assign color values to each of the pixels that are to be displayed. For example, pixel shader stage 32 may receive constant values stored in system memory 14, texture data stored in system memory 14, and any other data to generate per-pixel outputs such as color values. Pixel shader stage 32 may also output opacity values that indicate the opaqueness of the pixels.

Output merge stage 34 may perform any final pixel processing. For example, output merge stage 34 may utilize depth information to further determine whether any of the pixels should be removed from being displayed. Output merge stage 34 may also perform blending operations to generate final pixel values.

Output merge stage 34 may output the final pixel values to a frame buffer, generally located within system memory 14, but which may be located within GPU 12. A display processor (not shown) may retrieve the pixel values from the frame buffer and cause pixels of a display (not shown) of device 10 to illuminate accordingly to the pixel values to cause the display to display the image.

As described above, tessellation stage 24 interconnects points of the outer and inner rings within the domain to generate a plurality of primitives within the domain. In accordance with techniques described in this disclosure, tessellation stage 24 may utilize a single look-up table (referred to as a stitching table) to determine the manner in which the points should be interconnected to generate the primitives within the domain.

In some examples, GPU 12 may include local memory such as cache memory, and the cache memory may store the look-up table. In some other examples, system memory 14 may store the look-up table. For purposes of bandwidth efficiency, it may be more desirable for the local memory of GPU 12 to store the look-up table rather than system memory 14.

Furthermore, in some examples, the stitching table may be a preprogrammed stitching table. In other words, the stitching table may not be created during the execution of the application on CPU 16, or based on instructions received by GPU 12. Rather, the stitching table may define a specific way in which the primitives should be connected (i.e., stitched) for given tessfactors. For example, for X number of points along an edge of the outer ring (i.e., outer ring edge), and Y number of points along an edge of the inner ring (i.e., inner ring edge), there is a specific way in which the points are to be connected for each X and Y pair.

The specific way in which the points are to be connected may define how many points are to be taken from the outer ring edge, and how many points are to be taken from the inner ring edge to form the primitive. For example, assume that tessellation stage 24 divides a quad domain into triangle primitives. In this example, two points may be taken from the outer ring edge, and one point may be taken from the inner ring edge to form the triangle. Alternatively, one point may be taken from the outer ring edge, and two points may be taken from the inner ring edge to form a triangle. The stitching table may define how many points should be taken from each ring edge for the purposes of forming the primitives for a given number of points along the outer ring edge, and the number of points along the inner ring edge.

For stitching, the outer ring edge and the inner ring edge may be parallel with one another. In other words, the edges that are used for forming the primitives are corresponding edges in outer and inner ring. For example, when stitching primitives with points along the left edge of an outer ring of a quad domain, tessellation stage 24 may utilize the points along the left edge of the inner ring of the quad domain. The same may apply for the top, bottom, and right edges of the outer and inner rings.

The tessfactor that indicates the number of points that reside along the outer ring edge may form the basis for one index into the stitching table, and the tessfactors that indicates the number of points that reside along the inner ring edge may form the basis for another index into the stitching table. In this manner, the stitching table may be a two-dimensional (2D) look-up table. From the indices to the stitching table, tessellation stage 24 may retrieve an entry value. The entry value may be a series of bits (e.g., ones and zeros). Each bit may indicate how many points from the outer ring edge are used to form the primitive, and how many points from the inner ring edge are used to form the primitive. The manner in which the entry value indicates how many points from the inner ring edge and the how many points from the outer ring edge are used is described below in more detail.

Utilizing the 2D stitching table may allow tessellation stage 24 to determine how to interconnect the points within one clock cycle. For example, the entry values in the 2D stitching table may provide sufficient information that tessellation stage 24 does not need to access any other stitching table for the purposes of interconnecting the points of the primitives. This may allow domain shader stage 26 to add the primitives to the patch earlier than if tessellation stage 24 were to access multiple different look-up tables to determine the manner in which the points are to be interconnected to form the primitives. For example, some other techniques may waste computational cycles in reading a value from a table, determining whether the value is to be used for stitching, and then reading other values if the read value is not to be used for stitching. Also, some other techniques may waste computational cycles in accessing different tables. By using a single 2D stitching table, as described in this disclosure, there may be a reduction in the number of computational cycles needed to determine the manner in which the points are to be interconnected to form the primitives.

Accordingly, in some examples, the techniques described in this disclosure may increase the computational efficiency of the graphics processing pipeline of GPU 12, as compared to if tessellation stage 24 referred to multiple look-up tables. Furthermore, because tessellation stage 24 may access only one look-up table (i.e., the single 2D stitching table), and no other table to determine the manner in which the points are to be interconnected, the number of accesses to the local memory of GPU 12 or system memory 14 may be reduced, resulting in a reduction in power consumption and an increase in bandwidth efficiency.

FIG. 2 is a block diagram illustrating another example of a graphics processing unit (GPU) that may implement another example of a graphics processing pipeline in accordance with one or more examples described in this disclosure. For instance, FIG. 1 illustrated a graphics processing pipeline formulated substantially in accordance with the Direct3D 11 API. FIG. 1 illustrates the graphics processing pipeline substantially in accordance with the OpenGL 4.x API.

The OpenGL 4.x graphics processing pipeline may function in a substantially similar fashion as the Direct3D 11 graphics processing pipeline. Accordingly, for purposes of brevity, reference is made to FIG. 1 to describe components that are similar to both the Direct3D 11 graphics processing pipeline and the OpenGL 4.x graphics processing pipeline.

As illustrated in the example of FIG. 2, GPU 12 includes input assembler 36, vertex shader 38, tessellation control shader 40, primitive generator 42, tessellation evaluation shader 44, geometry shader 46, clipping unit 48, rasterizer 50, fragment shader 52, and post-processor 54. Similar to FIG. 1, in the example illustrated in FIG. 2, GPU 12 may include more or fewer components than those illustrated in FIG. 2. Also, the specific ordering of the unit is provided for purposes of illustration and should not be considered limiting.

In some ways, the tessellation process with the OpenGL 4.x graphics processing pipeline may be substantially similar to the tessellation process with the Direct3D 11 graphics processing pipeline. For example, OpenGL 4.x tessellation process may rely upon patches and control points, in the manner similar to that described above with respect to FIG. 1. For instance, input assembler 36 and vertex shader 38 of FIG. 2 may function substantially similar as input assembler stage 18 and vertex shader stage 20 of FIG. 1, respectively.

As more examples, for tessellation, tessellation control shader 40 of FIG. 2 may function substantially similarly to hull shader stage 22 of FIG. 1. However, tessellation control shader 40 outputs tessellation levels, which may be analogous to the tessfactors of Direct3D 11. For example, the tessellation levels of OpenGL 4.x may define the domain type, the number of rings within the domain, and the number of points per ring edge.

Primitive generator 42 may function in a substantially similar manner as tessellation stage 24. For example, primitive generator 42 may utilize the tessellation levels and the domain type to divide the domain into a plurality of primitives. Also, in accordance with techniques described in this disclosure, primitive generator 42 may utilize a single 2D look-up table as described above (i.e., the above described stitching table) for determining the manner in which primitives are to be interconnected.

Tessellation evaluation shader 44 of FIG. 2 may function substantially similarly to domain shader stage 26 of FIG. 1. For example, tessellation evaluation shader 44 may receive the vertices of the generated primitives from primitive generator 42 and add the primitive to the patch outputted by tessellation control shader 40. In this manner, the graphics processing pipeline of the OpenGL 4.x API may perform tessellation on a patch to increase the resolution of the patch.

Geometry shader 46 may function substantially similar to geometry shader stage 28. The combination of clipping unit 48 and rasterizer 50, in FIG. 2, may function substantially similarly to rasterizer stage 30 in FIG. 1. Fragment shader 52 and post-processor 54 in FIG. 2 may function substantially similar to pixel shader stage 32 and output merge stage 34 in FIG. 1, respectively. Post-processor 54 may output the final pixel values to a frame buffer and the display processor may retrieve the pixel values from the frame buffer and cause a display to illuminate according to the pixel values to display the image.

As described above, tessellation control shader 40, primitive generator 42, and tessellation evaluation shader 44 of FIG. 2 function substantially similar to hull shader stage 22, tessellation stage 24, and domain shader stage 26 of FIG. 1, respectively, for implementing the tessellation process. Accordingly, both the Direct3D 11 and the OpenGL 4.x APIs rely upon two programmable shader units and one fixed-function unit to implement the tessellation process.

For purposes of generality, the techniques described in this disclosure may be described with a first tessellation shader unit, a tessellation unit, and a second tessellation shader unit. Examples of the first tessellation shader unit include hull shader stage 22 and tessellation control shader 40. Examples of the tessellation unit include tessellation stage 24 and primitive generator 42. Examples of the second tessellation shader unit include domain shader stage 26 and tessellation evaluation shader 44.

Also, Direct3D 11 uses the term "tessfactors" and OpenGL 4.x uses the term "tessellation levels," which may be considered analogous terms. For purposes of generality, this disclosure uses the term "tessellation factor," examples of which include tessfactors and tessellation levels. In this way, the first shader unit may be considered as outputting tessellation factors to the tessellation unit, and the tessellation unit may output vertices to the second shader unit in response to the tessellation factors.

It should be noted that while the Direct3D 11 and OpenGL 4.x utilize two shader units and one fixed-function unit, the techniques described in this disclosure are not so limited. For example, it may be possible in other systems for the first and second shader units to be fixed-function units and the tessellation unit to be a shader unit. As another example, all may be fixed-function units or all may be shader units, or any combination thereof.

Therefore, in some examples, it may be considered that a first unit performs functions similar to the first shader unit, but may be a shader unit or a fixed-function unit, a second unit performs functions similar to the tessellation unit, but may be a shader unit or a fixed-function unit, and a third unit performs functions similar to the second shader unit, but may be a shader unit or a fixed-function unit. Moreover, although the first shader unit, the tessellation unit, and the second shader unit are illustrated as separate units in FIGS. 1 and 2, aspects of this disclosure are not so limited. These units, and possibly any unit of the graphics processing pipelines illustrated in FIGS. 1 and 2, may be combined together into a common unit. Accordingly, while the functionality of these units is described separately for ease of description, these units may be implemented in shared hardware or as distinct components.

Figure 3A:
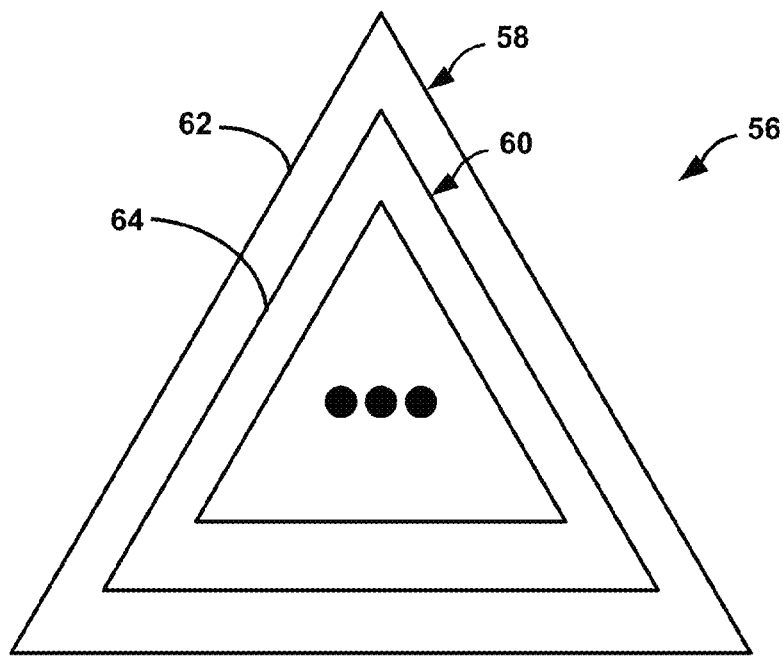
FIGS. 3A and 3B are graphical diagrams illustrating examples of domain types that include a plurality of inner rings for stitching in accordance with one or more examples described in this disclosure.
Figure 3B:
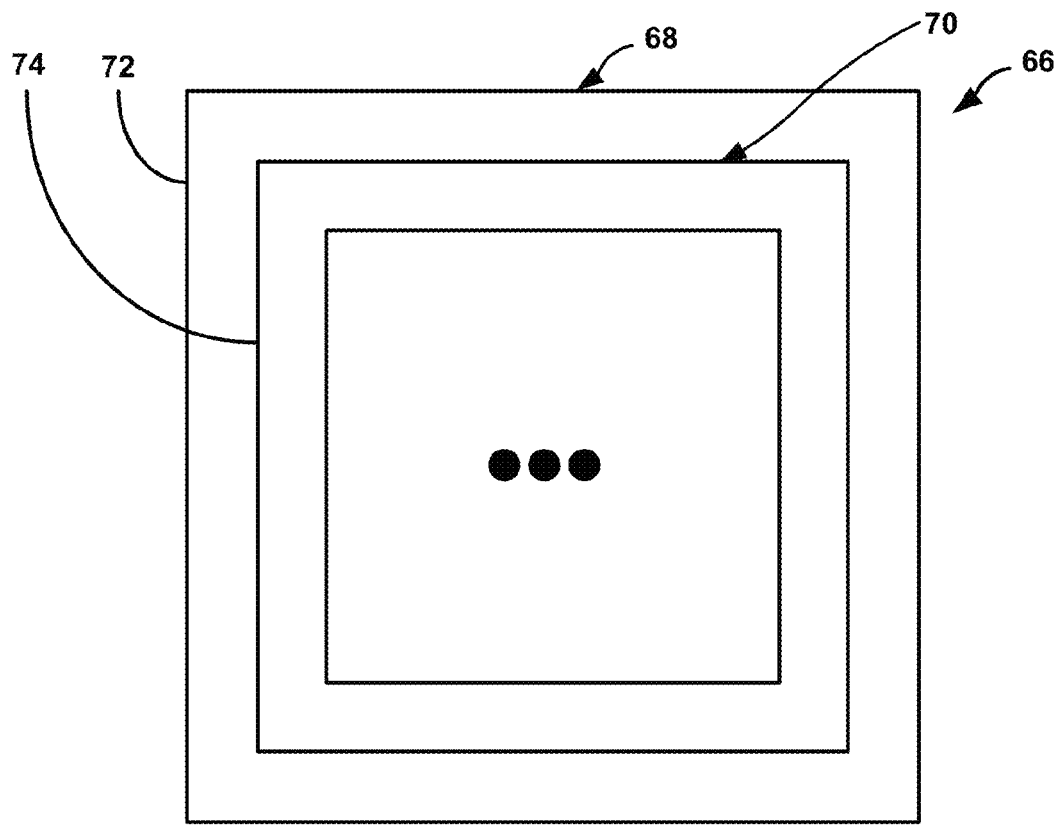

FIGS. 3A and 3B are graphical diagrams illustrating examples of domain types that include a plurality of inner rings in accordance with one or more examples described in this disclosure. For example, FIG. 3A illustrates triangle domain 56 and FIG. 3B illustrates quad domain 66. As illustrated, triangle domain 56 and quad domain 66 each include concentric triangles and squares, respectively.

In FIG. 3A, triangle domain 56 includes outer ring 58 and inner ring 60. Outer ring 58 includes outer ring edge 62, and inner ring 60 includes inner ring edge 64. Outer ring edge 62 and inner ring edge 64 are parallel with one another. In aspects described in this disclosure, the tessellation unit may interconnect (i.e., stitch) points along outer ring edge 62 with the points along inner ring edge 64. For example, the tessellation factors may define the number of points that reside along outer ring edge 62 and the number of points that reside along inner ring edge 64. As indicated in FIG. 3A, there is an addition inner ring, which is inner to inner ring edge 64.

The tessellation unit may utilize these tessellation factors to determine indices into the single 2D stitching table. The entry value in the stitching table that corresponds to the indices may define how many points along outer ring edge 62 and how many points along inner ring edge 64 the tessellation unit should interconnect to form the primitives whose vertices reside along outer ring edge 62 and inner ring edge 64.

After generating the primitive whose vertices reside along outer ring edge 62 and inner ring edge 64, the tessellation unit may advance to the other two edges of outer ring 58 and inner ring 60 in a clockwise fashion, in this example. For each of these edges of outer ring 58 and inner ring 60, the tessellation unit may access the single 2D stitching lookup table to determine the manner in which the points that reside along these edges are to be interconnected.

In some examples, after the tessellation unit completes the stitching of the primitives whose vertices reside along outer ring 58 and inner ring 60, the tessellation unit may proceed with the next inner ring. In this case, inner ring 60 becomes the outer ring, and the ring following inner ring 60 becomes the inner ring, and the process of accessing the 2D stitching table repeats until, upon progressively proceeding inward, there are no more rings.

The tessellation unit may perform similar function on quad domain 66. For example, in FIG. 3B, quad domain 66 includes outer ring 68 and inner ring 70. As illustrated, there is another inner ring, which is inner to inner ring 70. Outer ring 68 includes outer ring edge 72, and inner ring 70 includes inner ring edge 74. Outer ring edge 62 and inner ring edge 64 are parallel with one another, and the points along these edges may form primitives (e.g., may be vertices of the primitives).

Similar to the example of FIG. 3A, the tessellation unit may utilize the tessellation factors for outer ring edge 62 and inner ring edge 64 to determine indices into the single 2D stitching table. The entry value in the stitching table that corresponds to the indices may define how many points along outer ring edge 72 and how many points along inner ring edge 74 the tessellation unit should interconnect to form the primitives whose vertices reside along outer ring edge 72 and inner ring edge 74.

After generating the primitive whose vertices reside along outer ring edge 72 and inner ring edge 74, the tessellation unit may advance to the other two edges of outer ring 68 and inner ring 70 in a clockwise fashion, in this example, and may access the 2D stitching table to determine how the points are to be connected. In some examples, after the tessellation unit completes the stitching of the primitives whose vertices reside along outer ring 68 and inner ring 70, the tessellation unit may proceed with the next inner ring. In this case, inner ring 70 becomes the outer ring, and the ring following inner ring 70 becomes the inner ring, and the process of accessing the 2D stitching table repeats until, upon progressively proceeding inward, there are no more rings.

Figure 4A:
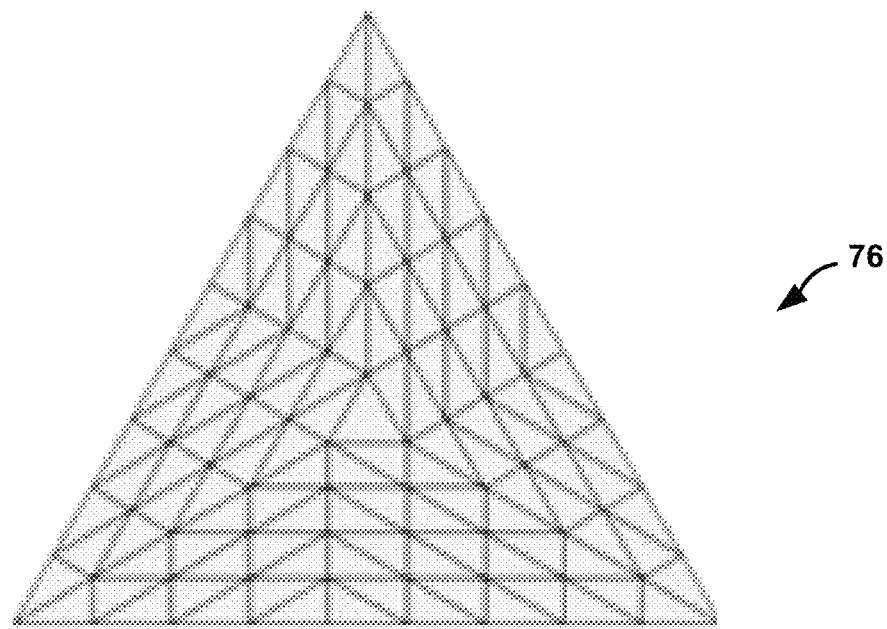
FIGS. 4A and 4B are graphical diagrams illustrating a domain divided into a plurality of primitives in accordance with one or more examples described in this disclosure.
Figure 4B:
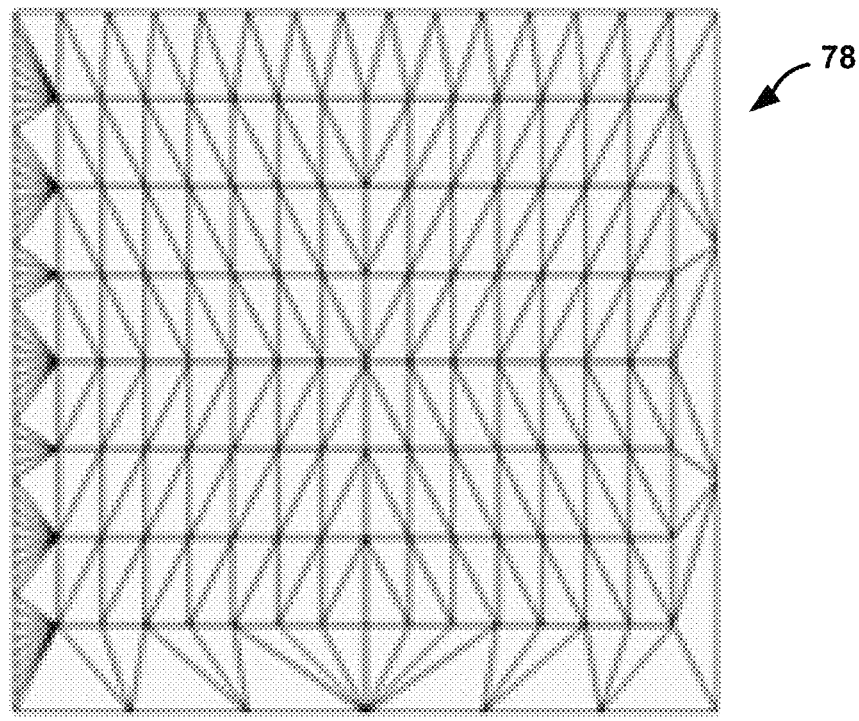

FIGS. 4A and 4B are graphical diagrams illustrating a domain divided into a plurality of primitives in accordance with one or more examples described in this disclosure. For example, FIG. 4A illustrates triangle domain 76 divided (i.e., tessellated) into a plurality of primitives, and FIG. 4B illustrates quad domain 78 divided into a plurality of primitives. The tessellation unit may utilize the single 2D stitching table to determine how the points along the edges of the rings of triangle domain 76 and quad domain 78 are to be connected together.

In FIGS. 4A and 4B, the interconnection of the points that form the triangle may be based on the tessellation factors. For example, the dense interconnections at the left edge of FIG. 4B are due to the interconnections as defined by the stitching table. For example, the tessellation factors for the left edge of FIG. 4B may form the basis for the indices into the stitching table. In this example, the entry value in the stitching table that corresponds to the indices may indicate that the points of the primitives should be connected in the manner illustrated for the left edge of FIG. 4B. The entry values in the stitching table may similarly indicate the manner in which the points along the different edges in FIGS. 4A and 4B should be connected based on the tessellation factors for the different edges.

Figure 5:
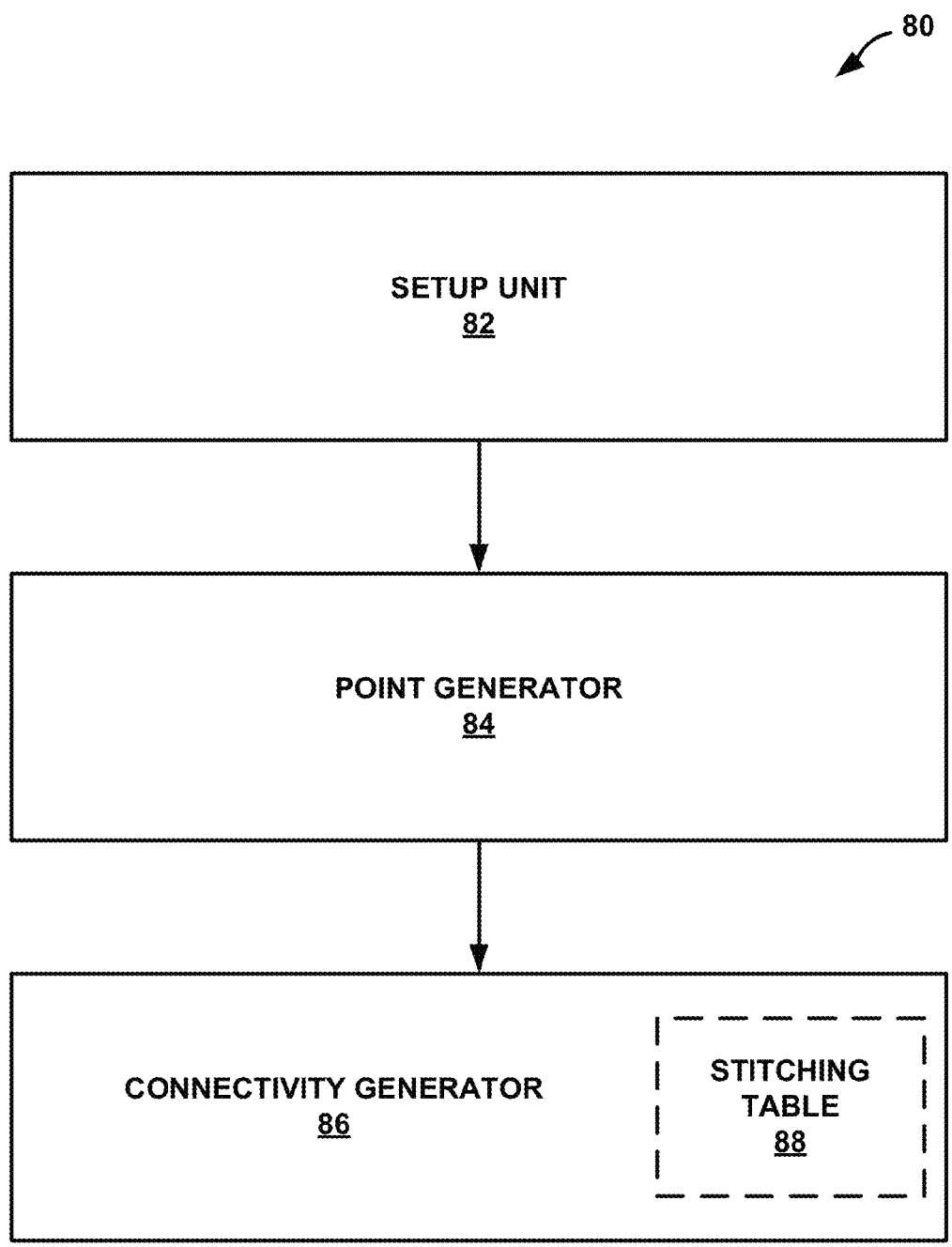
FIG. 5 is a block diagram illustrating an example of a tessellation unit in greater detail in accordance with one or more examples described in this disclosure.

FIG. 5 is a block diagram illustrating an example of a tessellation unit in greater detail in accordance with one or more examples described in this disclosure. For example, FIG. 5 illustrates tessellation unit 80. Examples of tessellation unit 80 include tessellation stage 24 of FIG. 1 and primitive generator 42 of FIG. 2.

Tessellation unit 80 may include setup unit 82, point generator 84, and connectivity generator 86, which may be fixed-function hardware units of tessellation unit 80. Setup unit 82, point generator 84, and connectivity generator 86 are illustrated as separate components for ease of description. Setup unit 82, point generator 84, and connectivity generator 86 may be formed as a single unit, as separate units, or a combination thereof. Stitching table 88 is illustrated as being within connectivity generator 86 for ease of illustration. However, stitching table 88 may reside within the local memory of GPU 12 or system memory 14.

Setup unit 82 may receive the tessellation factors as input a first shader unit such as hull shader stage 22 of FIG. 1 and tessellation control shader 40, and may determine the domain type from the tessellation factors. For example, if there are four tessellation factors, setup unit 82 may determine that the domain type is a triangle, and if there are six tessellation factors, setup unit 82 may determine that the domain type is a quad. Setup unit 82 may perform other setup functions such as correcting rounding problems, ceiling and floor functions, determining half tessellation factors, and reducing and combining tessellation factors. In general, setup unit 82 may process the tessellation factors to ensure that the other components of tessellation unit 80 can perform respective functions.

Point generator 84 may determine how many points reside along each edge of each ring of the domain, from the tessellation factors, and the locations of the points (e.g., the u, v coordinates or the u, v, w coordinates of the points). Connectivity generator 86 may connect (i.e., stitch) the points to form a plurality of primitives in the domain, such as those illustrated in FIGS. 4A and 4B.

For example, point generator 84 may determine coordinates of points along an outer ring, such as outer ring 58 and outer ring 68 of FIGS. 3A and 3B, respectively, and coordinates of points along an inner ring, such as inner ring 60 and inner ring 70 of FIGS. 3A and 3B, respectively. In some examples, point generator 84 may store the determined coordinates in buffers. For example, one buffer may store the coordinates of points along the inner ring edge, and another buffer may store the coordinates of points along the outer ring edge.

For each edge of the outer ring that is parallel with an edge of the inner ring, connectivity generator 86 may determine how the points of the outer ring edge should connect with the points of the inner ring edge to form primitives. For instance, there may be at least two different ways in which points along the outer ring edge and the points along the inner ring edge can form triangles. As one example, connectivity generator 86 may form a triangle using two points from the outer ring edge and one point from the inner ring edge, and connect them together to form a triangle. As another example, connectivity generator 86 may form a triangle using two points from the inner ring edge and one point from the outer ring edge to form the triangle.

In accordance with the techniques described in this disclosure, stitching table 88 may define which points connectivity generator 86 should utilize to form the primitives. In some examples, stitching table 88 may define which points connectivity generator 86 should utilize to form the primitives based on the number of points along the outer ring edge and the number of points along the inner ring edge. For example, there may be specific, predefined ways in which connectivity generator 86 should connect the points for a given number of points along the outer ring edge and a number of points along the inner ring edge.

Stitching table 88 may store such information regarding the way in which connectivity generator 86 should connect the points of the outer ring edge and the inner ring edge. In some examples, connectivity generator 86 may only need to access stitching table 88, and may not need to access any other table to determine the manner in which to connect the points of the outer ring edge and the inner ring edge.

As described above, stitching table 88 may be a 2D stitching table, and connectivity generator 86 may index stitching table 88 based on the number of points that are present along the inner edge and the outer edge. The number of points that are present along the inner edge and the outer edge may be based on the received tessellation factors.

Connectivity generator 86 may use the number of points that reside along the inner edge [i] as the basis for determining the column index of stitching table 88, and the number of points that reside along the outer edge [j] as the basis for determining the row index of stitching table 88. In other words, connectivity generator 86 may utilize the values [i, j] to access stitching table 88. In other examples, the number of points that reside along the inner edge may form the basis for indexing the row of stitching table 88, and the number of points that reside along the outer edge may form the basis for indexing the column of stitching table 88.

In some examples, the manner in which connectivity generator 86 connects the points may be based on half tessellation factors. For example, connectivity generator 86 may form primitives using half the points that reside along the outer ring edge and/or using half the points that reside along the inner ring edge (e.g., halfway along the length of the outer ring edge and/or inner ring edge). Connectivity generator 86 may then connect the remaining half of the points in the same way as the first half or in a reciprocal way. For example, when connecting the remaining half in the reciprocal way, the first half and the second half may appear as mirror primitives.

Because connectivity generator 86 copies or inverts the manner in which it connected the primitives in the first half of the outer ring edge and/or inner ring edge with the second half, connectivity generator 86 may only need to retrieve stitching information for the first half of the outer and/or inner ring edge. For example, assume that there are 10 points along the outer ring edge; in this example, connectivity generator 86 may retrieve information for how to connect 5 of the 10 points. In this manner, connectivity generator 86 may rely upon half tessellation factors (e.g., 5 divided by 10 is 0.5) to determine how to connect (i.e., stitch) the points.

Connectivity generator 86 may then connect the remaining 5 points in the same way or in an inverted way as the first 5 points. For example, in the inverted way, connectivity generator 86 may connect the remaining 5 points in such a manner that primitives generated from the remaining 5 points are the mirror primitives of the primitives generated from the first 5 points.

In examples where connectivity generator 86 relies on half tessellation factors, the number of rows and columns in stitching table 88 may be approximately half the maximum possible number of points in an edge (e.g., the outer ring edge or the inner ring edge). For instance, as described above, in some examples, the maximum number of points along an edge may be 65 points. In these examples, stitching table 88 may be a 33×33 table because 33 is approximately half of 65.

In some examples, there may be a requirement that half of an inner ring edge is not allowed to have less than 3 points. In these cases, rather than having 1 to 33 points along half of an inner ring edge, there may be 3 to 33 points along half of an inner ring edge. For these cases, it may be possible to reduce the size of stitching table 88. For example, because half of the inner ring edge may be allowed to have 3 to 33 points, it may be possible to remove rows from stitching table 88 for the cases where half of the inner ring edge has less than 3 points. For instance, the rows of stitching table 88 may be for the inner ring edge, and because there may be 3 to 33 points along half of an inner edge, stitching table 88 may need 31 rows to represent the possibility of 3 to 33 points. In these examples, stitching table 88 may be a 31×33 table.

Connectivity generator 86 may index stitching table 88 using the half tessellation factors to retrieve entry values that define the way in which connectivity generator 86 should connect points that reside along half an edge of the domain. For example, if the tessellation factors define that there are 10 points along the outer ring edge and 8 points along the inner ring edge, then the index into stitching table 88 is 5 and 4 (i.e., 10 divided by 2 is 5, and 8 divided by 2 is 4). If, however, half tessellation factors are not used then the index into stitching table 88 may be 10 and 8.

In some examples, connectivity generator 86 may subtract 2 from the half tessellation factor of the inner ring edge, and use the resulting value as the index into stitching table 88. For example, because in some instances, there may be only 3 to 33 points along half of an edge of an inner ring edge, resulting in 31 rows in stitching table 88, connectivity generator 86 may need to subtract 2 from the half tessellation factor to properly index stitching table 88 in these instances.

In this manner, connectivity generator 86 may determine a first index into stitching table 88 based on the number of points along the outer ring edge of the domain, and may determine a second index into stitching table 88 based on the number of points along the inner ring edge of the domain. Connectivity generator 86 may then utilize the first index and the second index to retrieve an entry value from stitching table 88.

The entry values may be plurality of bits, where each bit indicates how many points from the outer ring edge and how many points from the inner ring edge connectivity generator 86 should use to connect to form the primitives. For example, if the number of points on an edge is 64, then there may be a maximum of 128 primitives whose vertices reside along the outer ring edge and the inner ring edge. Accordingly, there may be a maximum of 64 primitives whose vertices reside along the halfway length of the outer and inner ring edges. In this example, the number of bits in the entry value may be 64, with each bit indicating the number of points from the inner and outer ring edges that connectivity generator 86 should use to form one primitive.

As one example, a bit value of 1 may indicate that connectivity generator 86 should utilize two points from the outer ring edge and one point from the inner ring edge to form a triangle primitive. A bit value of 0 may indicate that connectivity generator 86 should utilize one point from the outer ring edge and two points from the inner ring edge. However, in other examples, a bit value of 1 may indicate the connectivity generator 86 should utilize one point from the outer ring edge and two points from the inner ring edge, and a bit value of 0 may indicated that connectivity generator 86 should utilize two points from the outer ring edge and one point from the inner ring edge.

In this example, connectivity generator 86 may determine the bit value of each of the bits in the entry value starting from the least significant bit (LSB). The LSB may indicate how many points connectivity generator 86 should use from the inner and outer ring edges to generate the first primitive along the inner and outer ring edges. The bit after the LSB may indicate how many points connectivity generator 86 should use from the inner and outer ring edges to generate the second primitive along the inner and outer ring edges, and so forth. In some examples, the first primitive may be at the left bottom of the domain, and the second primitive may be the next primitive moving in a clockwise direction.

Connectivity generator 86 may repeat these steps until connectivity generator 86 generates a predetermined number of primitives (e.g., generates the primitives along half of the inner and/or outer ring edges). For example, the most significant bit (MSB) of the entry value from stitching table 88 may indicate how many points from the outer and inner ring edges connectivity generator 86 should use to generate the last primitive which occurs at the half way point along the inner and outer ring edges. Connectivity generator 86 may then repeat these steps for generating the primitives that reside along the second half of the inner and outer ring edges, as described above. For example, the total number of primitives that connectivity generator 86 is to create may be based on number of points along half of the outer ring edge and the number of points along half of the inner ring edge. For instance, by summing the number of points along half of the outer ring edge and the number of points along half of the inner ring edge, and subtracting one from the resulting value, connectivity generator 86 may determine the total number of primitives that are to be created along an inner and an outer ring edge.

In this manner, connectivity generator 86 may determine how many points of the outer ring and how many points of the inner ring edge to use to generate each of the plurality of primitives based on the retrieved entry value. The shader unit after the tessellation unit (e.g., domain shader 26 (FIG. 1) or tessellation evaluation shader 44 (FIG. 2)) uses the resulting plurality of primitives in the domain to add primitives in the patch. The resulting patch, with the additional primitives, is then further processed through the graphics processing pipeline and ultimately rasterized to render an image.

As described above, connectivity generator 86 may determine bit values of one or more bits (e.g., from the LSB to the MSB) of the entry value. In this example, each bit value of the one or more bits corresponds to each one of the plurality of primitives. Connectivity generator 86 may then connect the points of outer ring edge and the inner ring edge based on the determination to generate each of the plurality of primitives.

Furthermore, in some examples, connectivity generator 86 may connect points that reside up to halfway of the edge, and repeat for the other half. In these examples, the indices into stitching table 88 may be based on the half tessellation factors. In other examples, connectivity generator 86 may connect points all the way up the edge. In these examples, the indices into stitching table 88 may be based on the tessellation factors, and not necessarily the half tessellation factors.

The MSB need not necessarily be the first bit in the 64 bit entry value. For example, although half an edge may include a maximum of 64 primitives, in some examples, it is not necessary that there always be 64 primitives. In these examples, connectivity generator 86 may start with the LSB and determine bit values starting from the right to the left until connectivity generator 86 generated all of the primitives for the half the outer and inner ring edges. In this example, the last bit value that connectivity generator 86 determined may be considered as the MSB.

Connectivity generator 86 may then stop determining the bit value for any remaining bits in the entry value. For example, if there are only 50 primitives whose vertices are points along the inner and outer edge ring, then after determining the bit values for the LSB to the $50^{th}$ bit, starting from the LSB, connectivity generator 86 may stop determining the bit values for any of the remaining 14 bits of the 64 bit entry value.

As described above, stitching table 88 may define how many points from the inner and outer ring edges connectivity generator 86 should use for half an edge. However, aspects of this disclosure are not so limited. In other examples, stitching table 88 may define how many points from the inner and outer ring edges connectivity generator 86 should use for the entire inner and outer ring edges.

In this case, the size of stitching table 88 may be 64×64 because there are a maximum of 64 points along each of the outer and inner ring edges. Also, in this case, the number of bits of the entry value may be 128 because there could be up to 128 primitives whose vertices reside along the inner and outer ring edges; however, fewer primitives are possible. Accordingly, the index for the rows and columns of stitching table 88 may be based on the maximum number of allowable points along a ring edge. Also, the number of bits in the entry value may be based on the maximum number of allowable points along a ring edge.

Using half tessellation factors as indices and determining the connectivity for primitives that reside halfway up the inner and outer ring edges may allow for a smaller sized stitching table 88 that stores fewer bits. For example, as described above, when relying upon half tessellation factors, the size of stitching table 88 may be 33×33, rather than 64×64, and the number of bits in the entry value may be 64, rather than 128.

Figure 6:
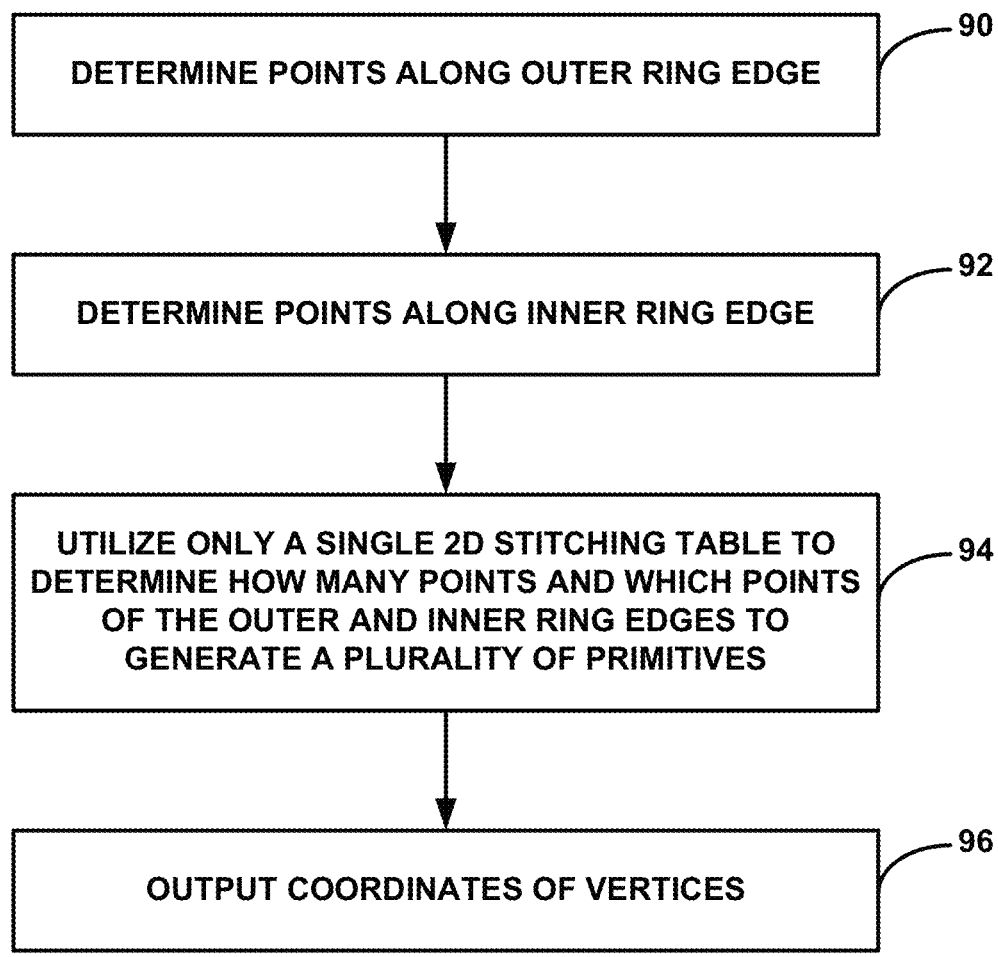
FIG. 6 is a flow chart illustrating an example stitching operation in accordance with one or more examples described in this disclosure.

FIG. 6 is a flow chart illustrating an example stitching operation in accordance with one or more examples described in this disclosure. For purposes of illustration only, reference is made to FIG. 5. As described above, FIG. 5 provides an example of a tessellation unit. Examples of the tessellation unit include tessellation stage 24 of FIG. 1 and primitive generator 42 of FIG. 2.

In FIG. 6, point generator 84 may be configured to determine a number of points along an outer ring edge of a domain (90). Point generator 84 may also determine a number of points along an inner ring edge of the domain (92). For example, point generator 84 may divide the length of the edge with the tessellation factor to determine the number of points along the outer ring edge and inner ring edge. For instance, if the tessellation factor indicates four for an edge, then there are four points that reside along the edge, which results in the edge being divided into five portions.

Connectivity generator 86 may be configured to utilize only a single stitching table 88, based on the number of points along the outer ring and the number of points along the inner ring edge, to determine how many points and which ones of the outer ring edge and how many points and which ones of the inner ring edge to use to generate each of a plurality of primitives whose vertices are the points along the outer ring edge and the points along the inner ring edge (94). Connectivity generator 86 may output the coordinates of the vertices (96). The output coordinates may then be processed utilizing the graphics processing pipeline as described above with respect to FIGS. 1 and 2.

FIGS. 7A-7G together illustrate an example of a stitching table. For instance, FIGS. 7A-7G together illustrate one non-limiting example of stitching table 88 of FIG. 5. For example, stitching table 88 may be preprogrammed stitching table, and FIGS. 7A-7G illustrate one such preprogrammed stitching table 88. Other stitching tables may be possible, and aspects of this disclosure should not be considered limited to the illustrated stitching table 88.

Due to the size of this example of stitching table 88, stitching table 88 is illustrated across FIGS. 7A-7G. As described above, in some examples, stitching table 88 may be a 31×33 table. FIG. 7A illustrates the 31 rows, and illustrates columns 1-7, labeled A-G, of the 33 columns. FIG. 7B illustrates the 31 rows, and illustrates columns 8-12, labeled H-L, of the 33 columns. FIG. 7C illustrates the 31 rows, and illustrates columns 13-18, labeled M-R, of the 33 columns. FIG. 7D illustrates the 31 rows, and illustrates columns 19-23, labeled S-W, of the 33 columns. FIG. 7E illustrates the 31 rows, and illustrates columns 24-28, labeled X-AB, of the 33 columns. FIG. 7F illustrates the 31 rows, and illustrates columns 29-31, labeled AC-AE, of the 33 columns. FIG. 7G illustrates the 31 rows, and illustrates columns 32 and 33, labeled AF and AG, of the 33 columns.

Moreover, for ease of illustration, FIGS. 7A-7G illustrate numerical values. However, in some examples, rather than storing numerical values, stitching table 88 may store binary value equivalents for the numerical values illustrated in FIGS. 7A-7G. For instance, in some examples, stitching table 88 may store 64 bit entry values. In these examples, the values illustrated in FIGS. 7A-7G may be represented by up to the 64 bits needed to represent the values illustrated in FIGS. 7A-7G. It should be understood that not all values illustrated in FIGS. 7A-7G need to be represented by 64 bits.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method for tessellation comprising:
   determining, with a graphics processing unit (GPU), a number of points along an outer ring edge of a domain;
   determining, with the GPU, a number of points along an inner ring edge of the domain;
   determining a first index into a single two-dimensional (2D) stitching table, and into no other table, based on the number of points along the outer ring edge of the domain;
   determining a second index into the single 2D stitching table, and into no other table, based on the number of points along the inner ring edge of the domain;
   utilizing the first index and the second index to retrieve an entry value comprising a plurality of bits from the single 2D stitching table;
   determining bit values of each of the bits of the retrieved entry value, wherein each bit value of the bits corresponds to different ones of a plurality of primitives that are generated from the points along the outer ring edge and inner ring edge;
   determining, based on each of the bit values of the bits of the retrieved entry value and no other values from the single 2D stitching table, how many points and which points of the outer ring edge and how many points and which points of the inner ring edge to use to generate every one of the plurality of primitives whose vertices are the points along the outer ring edge and the points along the inner ring edge; and
   outputting, with the GPU, coordinates of the vertices.

2. The method of claim 1, wherein determining the first index comprises dividing the number of points along the outer ring edge by two, and wherein determining the second index comprises dividing the number of points along the inner ring edge by two.

3. The method of claim 1, further comprising:
   connecting two points from the outer ring edge and one point from the inner ring edge when a bit value of the bits of the entry value is one to generate a primitive that corresponds to the bit value.

4. The method of claim 1, further comprising:
   connecting one point from the outer ring edge and two points from the inner ring edge when a bit value of the bits of the entry value is zero to generate a primitive that corresponds to the bit value.

5. The method of claim 1, wherein the inner ring edge is parallel to the outer ring edge.

6. The method of claim 1, wherein the outer ring edge comprises a first outer ring edge, the inner ring edge comprises a first inner ring edge, and the plurality of primitives comprises a first plurality of primitives, the method further comprising:
   determining a number of points along a second outer ring edge of the domain;
   determining a number of points along a second inner ring edge of the domain;
   utilizing, based on the number of points along the second outer ring edge and the number of points along the second inner ring edge, the single two-dimensional (2D) stitching table to determine how many points and which points of the second outer ring edge and how many points and which points of the second inner ring edge to use to generate every one of a second plurality of primitives whose vertices are the points along the second outer ring edge and the points along the second inner ring edge.

7. The method of claim 1, wherein the single 2D stitching table includes a plurality of rows and columns, and wherein a number of the rows and columns is based on a maximum number of allowable points along the outer ring edge and the inner ring edge.

8. A tessellation unit for a graphics processing unit (GPU), the tessellation unit comprising:
   a first unit configured to determine a number of points along an outer ring edge of a domain, and determine a number of points along an inner ring edge of the domain; and a second unit configured to:
determine a first index into a single two-dimensional (2D) stitching table, and into no other table, based on the number of points along the outer ring edge of the domain;
determine a second index into the single 2D stitching table, and into no other table, based on the number of points along the inner ring edge of the domain;
utilize the first index and the second index to retrieve an entry value comprising a plurality of bits from the single 2D stitching table;
determine bit values of each of the bits of the retrieved entry value, wherein each bit value of the bits corresponds to different ones of a plurality of primitives that are generated from the points along the outer ring edge and inner ring edge;
determine, based on each of the bit values of the bits of the retrieved entry value and no other values from the single 2D stitching table, how many points and which points of the outer ring edge and how many points and which points of the inner ring edge to use to generate every one of the plurality of primitives whose vertices are the points along the outer ring edge and the points along the inner ring edge; and
output coordinates of the vertices.

9. The tessellation unit of claim 8, wherein the first unit comprises a point generator, and the second unit comprises a connectivity generator.

10. The tessellation unit of claim 8, wherein the second unit divides the number of points along the outer ring edge by two to determine the first index, and divides the number of points along the inner ring edge by two to determine the second index.

11. The tessellation unit of claim 8,
the second unit is configured to connect two points from the outer ring edge and one point from the inner ring edge when a bit value of the bits of the entry value is one to generate a primitive that corresponds to the bit value.

12. The tessellation unit of claim 8,
the second unit is configured to connect one point from the outer ring edge and two points from the inner ring edge when a bit value of the bits of the entry value is zero to generate a primitive that corresponds to the bit value.

13. The tessellation unit of claim 8, wherein the inner ring edge is parallel to the outer ring edge.

14. The tessellation unit of claim 8, wherein the outer ring edge comprises a first outer ring edge, the inner edge comprises a first inner ring edge, and the plurality of primitives comprises a first plurality of primitives, and wherein the second unit is configured to:
determine a number of points along a second outer ring edge of the domain;
determine a number of points along a second inner ring edge of the domain;
utilize, based on the number of points along the second outer ring edge and the number of points along the second inner ring edge, the single two-dimensional (2D) stitching table to determine how many points and which points of the second outer ring edge and how many points and which points of the second inner ring edge to use to generate every one of a second plurality of primitives whose vertices are the points along the second outer ring edge and the points along the second inner ring edge.

15. The tessellation unit of claim 8, wherein the single 2D stitching table includes a plurality of rows and columns, and wherein a number of the rows and columns is based on a maximum number of allowable points along the outer ring edge and the inner ring edge.

16. A device comprising:
a central processing unit (CPU) configured to generate a patch to be tessellated;
a system memory configured to store the patch;
a graphics processing unit (GPU) comprising:
a first unit configured to receive the patch, from the system memory, as an input patch and output control points and tessellation factors for an output patch based on the input patch;
a tessellation unit configured to:
determine a type of a domain based on the tessellation factors;
determine a number of points along an outer ring edge of the domain based on the tessellation factors;
determine a number of points along an inner ring edge of the domain based on the tessellation factors;
determine a first index into a single two-dimensional (2D) stitching table, and into no other table, based on the number of points along the outer ring edge of the domain;
determine a second index into the single 2D stitching table, and into no other table, based on the number of points along the inner ring edge of the domain;
utilize the first index and the second index to retrieve an entry value comprising a plurality of bits from the single 2D stitching table;
determine bit values of each of the bits of the retrieved entry value, wherein each bit value of the bits corresponds to different ones of a plurality of primitives that are generated from the points along the outer ring edge and inner ring edge;
determine, based on each of the bit values of the bits of the retrieved entry value and no other values from the single 2D stitching table, how many points and which points of the outer ring edge and how many points and which points of the inner ring edge to use to generate every one of the plurality of primitives whose vertices are the points along the outer ring edge and the points along the inner ring edge; and
output coordinates of the vertices; and
a second unit configured to receive the coordinates of the vertices and add the primitives to the output patch based on the received coordinates of the vertices.

17. The device of claim 16, wherein the GPU includes a local memory that stores the 2D stitching table.

18. The device of claim 16, wherein the first unit comprises a first shader unit, and the second unit comprises a second shader unit.

19. The device of claim 18, wherein the first shader unit comprises at least one of a hull shader stage or a tessellation control shader, wherein the tessellation unit comprises at least one of a tessellation stage or a primitive generator, and wherein the second shader unit comprises at least one of a domain shader stage or a tessellation evaluation shader.

20. The device of claim 16, wherein the inner ring edge is parallel to the outer ring edge.

21. The device of claim 16, wherein the outer ring edge comprises a first outer ring edge, the inner edge comprises a first inner ring edge, and the plurality of primitives comprises a first plurality of primitives, and wherein the tessellation unit is configured to:
determine a number of points along a second outer ring edge of the domain;

determine a number of points along a second inner ring edge of the domain;

utilize, based on the number of points along the second outer ring edge and the number of points along the second inner ring edge, the single two-dimensional (2D) stitching table to determine how many points and which points of the second outer ring edge and how many points and which points of the second inner ring edge to use to generate every one of a second plurality of primitives whose vertices are the points along the second outer ring edge and the points along the second inner ring edge.

22. The device of claim 16, wherein the single 2D stitching table includes a plurality of rows and columns, and wherein a number of the rows and columns is based on a maximum number of allowable points along the outer ring edge and the inner ring edge.

23. A tessellation unit for a graphics processing unit (GPU), the tessellation unit comprising:

means for determining a number of points along an outer ring edge of a domain;

means for determining a number of points along an inner ring edge of the domain;

means for determining a first index into a single two-dimensional (2D) stitching table, and into no other table, based on the number of points along the outer ring edge of the domain;

means for determining a second index into the single 2D stitching table, and into no other table, based on the number of points along the inner ring edge of the domain;

means for utilizing the first index and the second index to retrieve an entry value comprising a plurality bits from the single 2D stitching table;

means for determining bit values of each of the bits of the retrieved entry value, wherein each bit value of the bits corresponds to different ones of a plurality of primitives that are generated from the points along the outer ring edge and inner ring edge;

means for determining, based on each of the bit values of the bits of the retrieved entry value and no other values from the single 2D stitching table, how many points and which points of the outer ring edge and how many points and which points of the inner ring edge to use to generate every one of the plurality of primitives whose vertices are the points along the outer ring edge and the points along the inner ring edge; and means for outputting coordinates of the vertices.

24. A non-transitory computer-readable storage medium including instructions stored thereon that when executed cause one or more processors to:

determine a number of points along an outer ring edge of a domain;

determine a number of points along an inner ring edge of the domain;

determine a first index into a single two-dimensional (2D) stitching table, and into no other table, based on the number of points along the outer ring edge of the domain;

determine a second index into the single 2D stitching table, and into no other table, based on the number of points along the inner ring edge of the domain;

utilize the first index and the second index to retrieve an entry value comprising a plurality of bits from the single 2D stitching table;

determine bit values of each of the bits of the retrieved entry value, wherein each bit value of the bits corresponds to different ones of a plurality of primitives that are generated from the points along the outer ring edge and inner ring edge;

determine, based on each of the bit values of the bits of the retrieved entry value and no other values from the single 2D stitching table, how many points and which points of the outer ring edge and how many points and which points of the inner ring edge to use to generate every one of the plurality of primitives whose vertices are the points along the outer ring edge and the points along the inner ring edge; and output coordinates of the vertices.

* * * * *